United States Patent [19]
Glazer et al.

[11] Patent Number: 4,829,587
[45] Date of Patent: May 9, 1989

[54] FAST BITONAL TO GRAY SCALE IMAGE SCALING

[75] Inventors: Frank C. Glazer, Wellesley; John K. Trimper, Ayer, both of Mass.

[73] Assignee: Digital Equipment Corporation, Maynard, Mass.

[21] Appl. No.: 20,267

[22] Filed: Mar. 2, 1987

[51] Int. Cl.$^4$ ............................................. G06K 9/42
[52] U.S. Cl. ............................ 382/47; 340/728; 340/731; 364/723; 382/50
[58] Field of Search ............ 382/44, 47, 50, 27; 358/140, 288, 287, 180; 340/731, 741, 728; 364/577, 723

[56] References Cited

U.S. PATENT DOCUMENTS

| | | | |
|---|---|---|---|
| 4,528,693 | 7/1985 | Pearson et al. | 382/47 |
| 4,532,602 | 7/1985 | Du Vall | 382/47 |
| 4,602,346 | 7/1986 | Kawakami et al. | 382/47 |
| 4,603,348 | 7/1986 | Yamada et al. | 382/44 |
| 4,725,892 | 2/1988 | Suzuki et al. | 340/731 |

OTHER PUBLICATIONS

"Principles of Interactive Computer Graphics" 2d. Ed., Newman and Sproull, McGraw-Hill Book Co., 1979.
"Fundamentals of Interactive Computer Graphics", Foley and VanDam, Addison-Wesley Publishing Co., 1982.
"High-Speed Image Scaling for Integrated Document Management", K. Tabata, 1984 ACM 0-89791-14-0-7/84/006/0036.
"The Display of Characters Using Gray Level Sample Arrays", J. Warnock, 190 ACM 0-89791-021-4/80/07-00-0302.
"Scaling Binary Images with the Telescoping Template", Ulichney and Troxel, 1982, IEEE 0162-8828/82/0500-0331.
"Low Resolution Multi-Level Representation of Bi-level Images", J. Sara, S. B., MIT, 1980.
"Filtering High Quality Text for Display on Raster Scan Devices", Kajiya & Ullner, 1981 ACM 0-8971-04-5-1/81-0800-0007.
"Incremental Linear Interpolation", Field, 1985 ACM 0730-0301/85/0100-0001.

*Primary Examiner*—Leo H. Boudreau
*Assistant Examiner*—Joseph Mancuso
*Attorney, Agent, or Firm*—Nutter, McClennen & Fish

[57] ABSTRACT

A device for re-scaling an image to change the resolution with which discrete pixel values represent it includes a scan-line interface (40) and an alignment circuit (45) that assemble sets of the original pixel values into submatrices and apply them to a convolution engine (46), which computes new pixel values from them. X and Y scaling engines (58 and 60) control the re-scaling without having to generate original-pixel address at the rate at which new pixels are generated. The X scaling engine (58) simply indicates whether an output the currently supplied input data should be used to generate an output intensity value and, if so, whether it should be retained for generation of the subsequent intensity value, too. Similarly, the Y scaling engine (60) indicates whether the next scan line to be received should be used for generation of a scan line of output intensity values and, if so, whether it should be retained for generation of a subsequent scan line of output intensity values. In generating the new pixel values, the convolution engine (46) converts from the binary, black-and-white levels of the original pixels to gray-scale values for the new pixels to reduce the jaggedness that scale changes can cause.

37 Claims, 5 Drawing Sheets

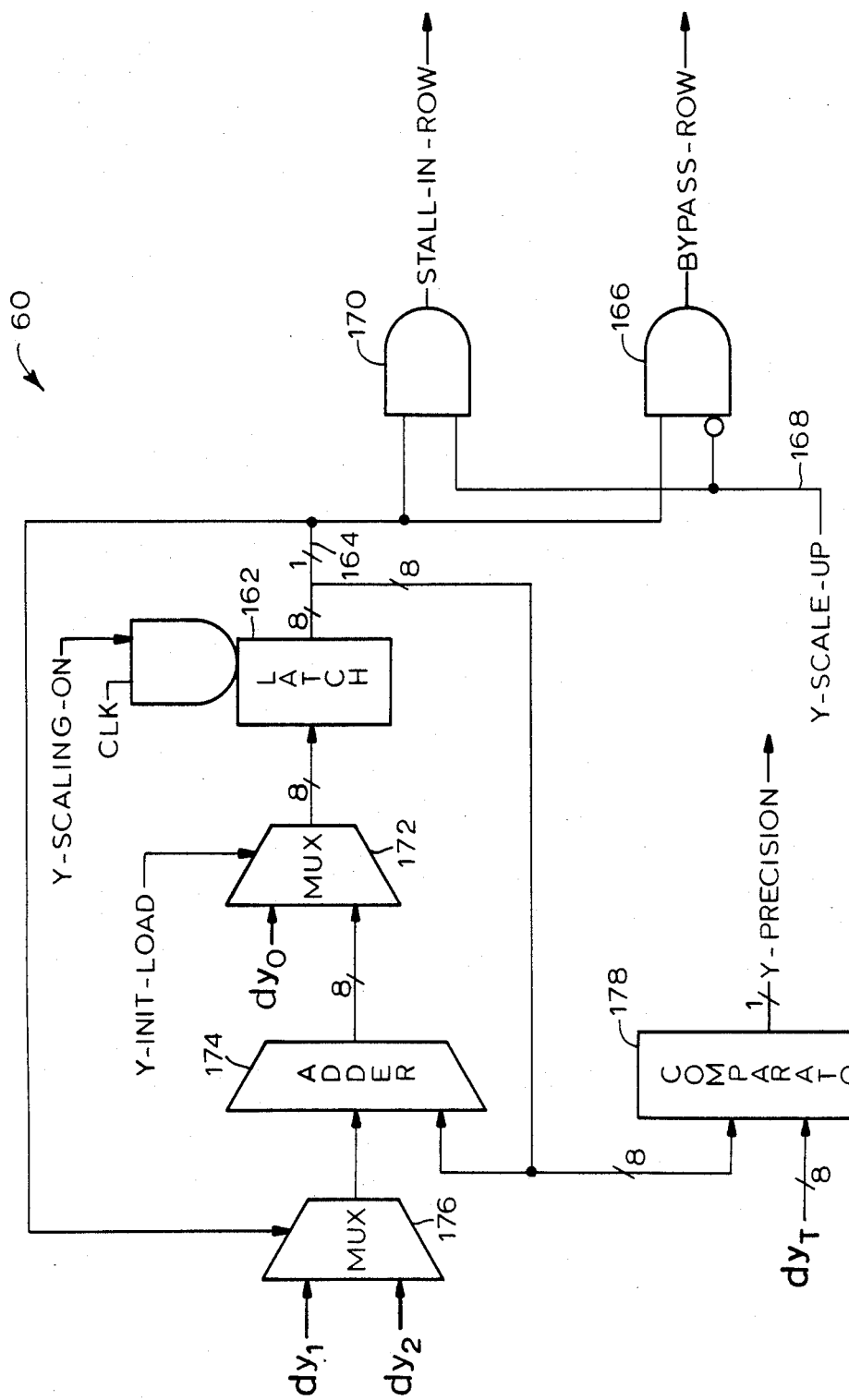

FAST BITONAL TO GRAY SCALE IMAGE SCALING

BACKGROUND OF THE INVENTION

The present invention is directed to image processing and particularly to means for changing the scale with which an image is displayed.

In displaying a stored image, it sometimes occurs that the device with which the image is to be displayed has a higher or lower resolution than that at which the image is stored. For instance, the image may be stored in a 512×512 matrix, while the display device displays it only in a 256×256 matrix. In such a case, it is necessary to determine which stored data are to be employed in providing the output data.

In the case of the two-to-one reduction just described, the method for making the determination can be fairly simple; every second scan line in the stored image can be eliminated, as can every second pixel (picture element) in the remaining scan lines. Conversely, in a one-to-two expansion, each stored pixel can be employed as four display pixels. Similar methods can be employed for any expansion that employs integer scale factors.

However, simple resolution reductions of the type described above result in a jaggedness not found in the stored image. Also, although simple resolution increases of the above type technically do not increase jaggedness, the display device that requires the resolution increase may display the image at a larger display size so that the jaggedness that was already in the stored image may be more objectionable in the increased-resolution image.

Further problems occur when the scale factor is not an integer. In such cases, determining which input value to use as a given output value is not as straightforward as it is in the integer-scale-factor case and thus tends to be time-consuming. In order to accomplish such scale changes rapidly, therefore, some systems in the past have computed and stored a sequence of input locations to be used to generate the values for the output locations. For large images, such as the high-resolution images often employed to represent scanned documents, this approach can require a prohibitively large memory.

Another problem attends some attempts to increase the fidelity of the conversion by interpolating between input values. In all conversions other than simple resolution reductions with integer scale factors, some output locations fall between input locations, so there is no input value that gives the value of the image at certain of the output locations. An obvious expedient in such situations is to assign to an output location the value associated with the input location to which that output location is closest. In order to achieve greater fidelity to the underlying image, on the other hand, one might try to interpolate between the values of two or more input values to approximate the image value at the output location. But the time required for interpolation, added to the time required for other processing, may slow the conversion process intolerably.

It is accordingly an object of the present invention to retain a high level of image fidelity despite resolution changes. It is another object to provide a rapid method of image generation that is applicable throughout a wide range of scale factors. It is a further object to provide changes of scale in an efficient manner.

SUMMARY OF THE INVENTION

Certain of the foregoing and related objects are achieved in an apparatus that processes a black-and-white image to produce an output image that includes shades of gray by means of an interpolation or filtering process. Such an arrangement reduces the jaggedness that might otherwise be emphasized in a scaled-up image.

Other objects are achieved in a scaling circuit that processes a matrix of input intensity values in a particularly efficient manner to generate a matrix of output intensity values representing the same image at a different spatial resolution. In the general manner ordinarily employed to filter a two-dimensional image, it convolves each of a number of submatrices of the input matrix to generate the output intensity values. In doing so, however, it departs from the usual filtering method, which uses the same filter kernel through out the image. Instead, the apparatus of the present invention changes kernels in accordance with the position of the output location that the output intensity value is to represent. In doing so, it effectively obtains the inter-pixel resolution that interpolation would afford, but it does so without performing a separate interpolation step.

Specifically, the different kernels approximate the results of convolving different interpolation kernels with the same filter kernel. If the different interpolation kernels were themselves convolved with an intensity matrix, they would produce the intensity values at interpolated points having predetermined relative positions with respect to the points represented by the intensity matrix, the relative positions of the interpolated points being different for the different interpolation kernels. To generate the intensity value for a given output point, the present invention uses the kernel that was derived from the interpolation kernel associated with the interpolated point closest to that output point.

Since convolution is an associative operation, convolution with the resultant kernel is equivalent to interpolating first and then convolving with the filter kernel to generate the output. However, convolution with the resultant kernel has the advantage that it eliminates the need to perform a separate interpolation operation for each output location.

Some of the objects are achieved in an apparatus that determines which input data to use to generate a given output but does so without calculating the actual addresses of the input locations with which those data are associated. This apparatus fetches data representing successive input locations in a scan line and concurrently uses some or all of the data to generate output intensity values for a succession of output locations. Rather than employ a precalculated or currently calculated list of input locations, the apparatus simply fetches in sequence the data representing all of the input locations, but it employs a scaling circuit that indicates whether the currently fetched data should be used to generate the next output intensity in the sequence and, if so, whether it should also be retained for generation of one or more further output intensities in the sequence. In this way, the apparatus avoids the need to generate complete addresses at the pixel rate.

BRIEF DESCRIPTION OF THE DRAWINGS

These and further features and advantages of the present invention are described in connection with the present invention, in which:

FIG. 6 is a block diagram of the y scaling engine of FIG. 4.

DETAILED DESCRIPTION OF THE PREFERRED EMBODIMENTS

Figure 1:
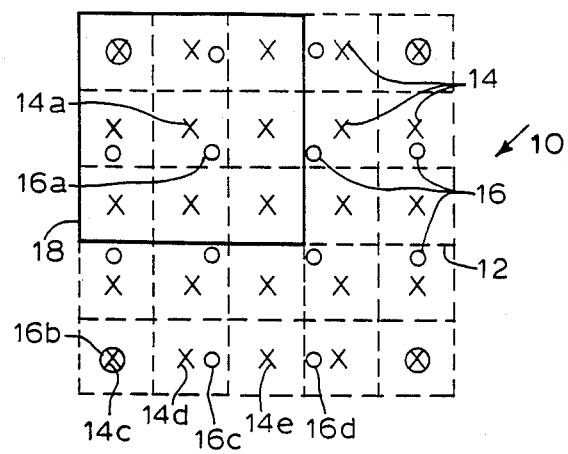
FIG. 1 is a diagram depicting an example relationship between input and output sampling.

FIG. 1 depicts an image region 10. The image region 10 may be considered to be located in an x-y coordinate system, and the image may be thought of as a continuous intensity function of x and y. Digital systems represent images as sets of intensity values, one intensity value for each picture element ("pixel") in the image. Dashed lines 12 in FIG. 1 illustrate the division of the image into picture elements.

It is helpful to think of the intensity values stored in a digital representation as being samples taken at the center of each pixel. In FIG. 1, Xs 14 represent these sample locations.

The ultimate purpose of the apparatus of the present invention is to process a given number of intensity values that represent an image and convert them into a different number of intensity values that represent the same image. This can be thought of as resampling the image at different locations. In FIG. 1, for instance, the original samples are taken at the points represented by the Xs 14 so that a 5×5 matrix represents the image. In order to display the thus-represented image on a display device that employs a 4×4 array of pixels, one must find the values of the image function at a new, 4×4 array of locations such as those represented by the circles 16 of FIG. 1. The Xs can be thought of as input locations, and the circles 16 can be thought of as output locations. FIG. 1 depicts the input pixels whose centers are the input locations. For the sake of clarity, FIG. 1 does not depict the output pixels, but they are correspondingly larger rectangles centered on the circles 16.

In FIG. 1, the beginning and end output locations in the top and bottom rows coincide with the beginning and end output locations, respectively, in the top and bottom rows. In effect, this approach uses two intermediate output locations to divide the interval between the beginning and end input locations into three subintervals. This is the not the only possible way to re-sample the image area 10.

For instance, the terminal output locations can be allowed to be different from the terminal input locations, and the lines defined by the locations in the terminal output rows can be allowed to differ from those defined by the locations in the terminal input rows. The width of the image can be treated as the distance between a position half an input-pixel width to the left of the beginning input location and ending half an input-pixel width to the right of the end input location, and its length can be treated as the distance between a position half an input-pixel width above the top input row and ending half an input-pixel width below the bottom input row. Then all four output locations in a row and column can be used to divide the width and length into five equal subintervals, respectively.

By a proper choice of parameters, the apparatus of the present invention can provide this type of spacing, too. For the purpose of explaining the operation of the illustrated embodiment, however, the remainder of the description will be based on the assumption that input and output locations are the same at the beginnings and ends of the first and last rows.

In performing its overall task, the apparatus described below performs several functions that contribute to display fidelity. The illustrated embodiment of the apparatus is intended for bitonal input images. That is, the input images are of the typically black-and-white type used to display print in many types of drawings. One function of the illustrated embodiment is to convert the bi-tonal input image to a gray-scale output image. We have found that various objectionable artifacts of the re-scaling process are ameliorated by conversion to gray scale. The gray-scale conversion can be performed by simply retaining all or many of the bits in the natural results of the various processing steps that will be described below. In the alternative, these processing results can be compared with a succession of levels, and the gray scale can be the results of those comparisons.

Another function of the illustrated embodiment is to filter the input intensity data. For resolution reduction, it is desirable to low-pass filter the discrete-value image "signal" so that it does not contain components having a spatial frequency greater than half the spatial frequency of the output sampling. The output intensities can then be determined by interpolating between the resultant values that represent the filtered image. The illustrated apparatus performs the filtering, but, rather than performing a time-consuming interpolation operation, it approximates the same result by using different filter kernels to produce output intensity values for different sets of output locations.

To filter a two-dimensional function such as the intensity function representing an image, one convolves the function with a two-dimensional impulse response. In the discrete case, this means generating each output value by multiplying each element of a submatrix representing the intensities within a "window" of the input image by corresponding elements in a *kernel* of the same size representing the filter's "impulse response." Suppose a filtered value is to be computed for the value representing the image at location 14a of FIG. 1. Suppose, further, that the kernel is a 3×3 matrix. In this case, the "window" is the area within rectangle 18 of FIG. 1, and the submatrix representing the intensities at these locations are multiplied element-by-element by the elements of a 3×3 kernel. The sum of the resulting products is then the filtered value for the intensity at location 14a. Specifically, $$I_{i,j}' = \sum_{n=-1}^{1} \sum_{m=-1}^{1} I_{i-m, j-n} K_{m,n}$$

Of course, if the output location whose intensity value is to be generated is on the top or bottom row of the image, or on the first or last column, the submatrix from which it is to be computed is not complete; its window extends beyond the edge of the image.

To deal with this situation, we have chosen to replicate the outermost input row or column to the extent necessary to fill the submatrices. Although this is our choice, the manner used to deal with these points is not important as a practical matter. The difference in the final visual effect is negligible because the affected areas are small and lie on the border of the image. This is particularly true because the arrays involved are so large; to represent an 8.5"×11" document at a resolution of 200 pixels/inch, for example, requires a 1700×2200 array.

To generate the intensities for the scaled image, one could simply employ the filtered value of the closest input location. For example, the intensity representing output location 16a could simply be chosen as the filtered value for input location 14a. The apparatus of the present invention does not employ this approach, however, because it would not result in the fidelity that can be obtained by interpolating between the raw input values to obtain the filter inputs.

To obtain that fidelity, one could interpolate among the values of the several closest input locations, but this would require additional computation, which may not be feasible in certain arrangements requiring real-time transformation. The apparatus of the present invention does not employ this approach, either.

Instead, the present apparatus obtains inter-pixel resolution by a judicious choice of kernels. The kernel choice is described in connection with FIG. 2.

Figure 2:
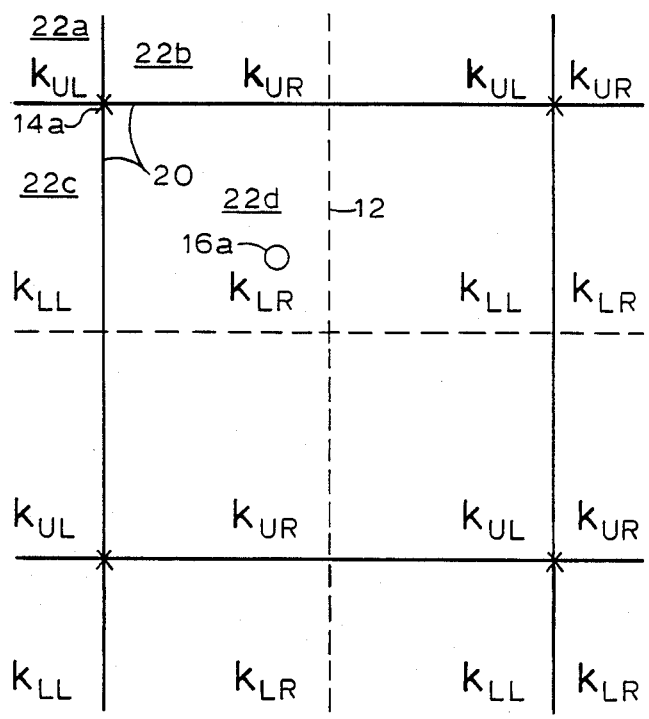
FIG. 2 is a more-detailed drawing of a portion of FIG. 1 depicting division of the image into subpixels.

FIG. 2 is an expanded view of the portion of the image around input location 14a. As before, dashed lines 12 represent the outline of the pixels, including the pixel of which input location 14a is the center. The output intensity value for output location 16a is determined by convolving a kernel with the submatrix centered on the center location 14a of the input pixel into which output location 16a falls. However, the kernel used to generate the intensity for output location 16a is different from the kernel that would be used if location 16a were located in a different portion of the input pixel 12. Solid lines 20 divide the pixel into four sections 22a, 22b, 22c, and 22d, each of which contains a different kernel name $K_{UL}$, $K_{UR}$, $K_{LL}$, or $K_{LR}$ representing a different kernel. The kernel name in the subkernel represents the kernel that would be used if the output location were positioned within that subpixel.

The same four kernels, $K_{UL}$, $K_{UR}$, $K_{LL}$, and $K_{LR}$ are associated with each of the other input locations, too, and the pixel associated with each other input location is similarly divided into four subpixels. The effect of using different kernels is to achieve subpixel resolution, as will be explained in the discussion of the kernel generation.

Prior to discussing the generation of the kernels, however, we will illustrate another approach to kernel choice, which can also be implemented with the apparatus of the present invention.

Figure 3:
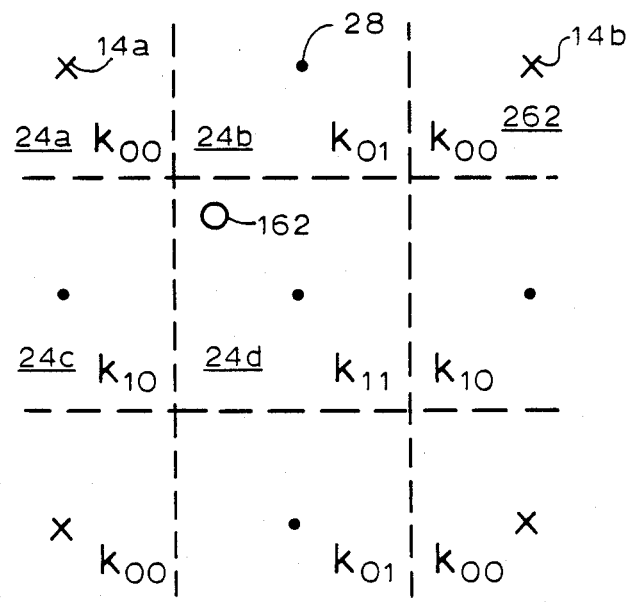
FIG. 3 is a view similar to FIG. 2 with a different subpixel division.

FIG. 3 is similar to FIG. 2 in that it depicts input location 14a and output location 16a. Like FIG. 2, FIG. 3 also depicts subpixels, but the subpixels 24a–d of FIG. 3 are different from those of FIG. 2; subpixels 24b–d all overlap pixel boundaries. Pixel 24b, for instance, includes regions both within the pixel centered on input location 14a and in the pixel centered on location 14b. Nonetheless, the kernel choice is made in a similar manner. That is, the intensities of output-pixel locations that fall within subpixel 24a are generated by convolving the input submatrix centered on location 14a with a kernel $K_{00}$. Similarly, that same submatrix is convolved with $K_{11}$ to produce intensity values for output locations that fall within subpixel 24d. For an output location that falls within subpixel 26a, on the other hand, kernel $K_{00}$ is again employed, but a different submatrix, this one centered on location 14b.

We now turn to the manner in which the kernels are determined. Although we illustrated a 3×3 kernel above for the sake of simplicity, we prefer 5×5 kernels because they yield greater fidelity without exacting an excessive hardware penalty. The following example therefore involves 5×5 kernels.

Suppose that it is desired to use the following kernel to filter the input intensity values:

| 1 | 4 | 6 | 4 | 1 |
|---|---|---|---|---|
| 4 | 16 | 24 | 16 | 4 |
| 6 | 24 | 35 | 24 | 6 |
| 4 | 16 | 24 | 16 | 4 |
| 1 | 4 | 6 | 4 | 1 |

That is, to generate the filtered value at a particular input location, a 5×5 submatrix of unfiltered values centered on that input location is multiplied element-by-element by the above kernel. Note that, although the value of each element in the input submatrix is either a 1 or a 0, representing only either black or white, convolution with this kernel yields a range from 0 to 255, representing various shades of gray. The conversion to a gray-scale output can be provided by merely retaining more than one bit of this intensity resolution.

In the example organization given in FIG. 3, the kernel given above is the $K_{00}$ kernel. In other words, if the output location falls within the subpixel surrounding location 14a, the value assigned to it is the result of convolution with the kernel set forth above.

If the output location falls within subpixel 24b, the output intensity value is instead the filtered value at the interpolated location represented by dot 28 at the center of subpixel 24b. In principle, the interpolated value is obtained by, first, interpolating between the unfiltered values associated with input locations 14a and 14b, as well as those for similarly located inter-pixel locations in the other subpixels each associated with kernel $K_{01}$. The filter represented by kernel $K_{00}$ is then applied to the resultant interpolated values to obtain the filtered intensity value for the interpolated location 28.

Although the preceding discussion describes the effect of the apparatus to be described in connection with FIG. 4, that apparatus actually avoids explicit computation of interpolation values. We have avoided such computation as a result of two observations. The first is that interpolation is a type of convolution; for example, linear interpolation to a point halfway between adjacent locations on the same row is equivalent to convolution with the one-dimensional interpolation kernel [0.5, 0.5].

The second observation is that convolution operations are associative. Therefore, convolving the filter kernel with an interpolation kernel and then convolving the input intensity matrix with the result is mathematically equivalent to interpolating between the intensity values and then filtering the result. The latter approach requires two operations for each output intensity value, however, while the former requires only one, and it is the former approach that the apparatus of the present invention employs.

Specifically, we perform a single initial convolution of [0.5, 0.5] with $K_{00}$ to produce a new kernel $K_{01}$. Actual computation of the new kernel is performed outside of the apparatus, typically by the user, and the results are loaded into the apparatus before operation begins. During the actual operation, then, we convolve the resultant kernal $K_{01}$ with an input submatrix one time for each output location in a subpixel associated kernel $K_{01}$. For the $K_{00}$ kernel given above, kernel $K_{01}$ is:

| 0.5 | 2.5 | 5    | 5    | 2.5 | 0.5 |
|-----|-----|------|------|-----|-----|
| 2   | 10  | 20   | 20   | 10  | 2   |
| 3   | 15  | 29.5 | 29.5 | 15  | 3   |
| 2   | 10  | 20   | 20   | 10  | 2   |
| 0.5 | 2.5 | 5    | 5    | 2.5 | 0.5 |

To obtain the kernel $K_{10}$ to be used for subpixel 24c and similarly located subpixels, we convolve the basic kernel $K_{00}$ with the following inter-column-interpolation matrix:

0.5
0.5

The result is the following kernel $K_{10}$:

| 0.5 | 2   | 3    | 2   | 0.5 |
|-----|-----|------|-----|-----|
| 2.5 | 10  | 15   | 10  | 2.5 |
| 5   | 20  | 29.5 | 20  | 5   |
| 5   | 20  | 29.5 | 20  | 5   |
| 2.5 | 10  | 15   | 10  | 2.5 |
| 0.5 | 2   | 3    | 2   | 0.5 |

Generation of the $K_{11}$ kernel is performed by convolving the base kernel $K_{00}$ with the following bilinear-interpolation matrix used to find the intensity value for a location that is both between rows and between columns:

| 0.25 | 0.25 |
|------|------|
| 0.25 | 0.25 |

The result of this convolution is the following kernel $K_{11}$:

| 0.25 | 1.25 | 2.5   | 2.5   | 1.25 | .25  |
|------|------|-------|-------|------|------|
| 1.25 | 6.25 | 12.5  | 12.5  | 6.25 | 1.25 |
| 2.5  | 12.5 | 24.75 | 24.75 | 12.5 | 2.5  |
| 2.5  | 12.5 | 24.75 | 24.75 | 12.5 | 2.5  |
| 1.25 | 6.25 | 12.5  | 12.5  | 6.25 | 1.25 |
| 0.25 | 1.25 | 2.5   | 2.5   | 1.25 | .25  |

Note that, although we have employed interpolation kernels that implement linear interpolation, the present invention can employ kernels that implement other types of interpolation. Quadratic interpolation, for instance, might be implemented by $1 \times 3$, $3 \times 1$, and $3 \times 3$ matrices.

In actual practice, the specific embodiment that we use does not employ the kernels given above. It was more convenient to use $5 \times 5$ kernels and whole-number arithmetic. Also, we wanted the output range of the convolution substantially to span but not exceed the 8-bit range from 0 to 255. Application of these requirements results in the following modified kernels:

| $K_{00}$ | | | | | $K_{01}$ | | | | | $K_{10}$ | | | | | $K_{11}$ | | | | |
|---|---|---|---|---|---|---|---|---|---|---|---|---|---|---|---|---|---|---|---|
| 1 | 4  | 6  | 4  | 1 | 3  | 5  | 5  | 3  | 0 | 3 | 10 | 16 | 10 | 3 | 7  | 14 | 14 | 7 | 0 |
| 4 | 16 | 24 | 16 | 4 | 10 | 21 | 21 | 10 | 0 | 5 | 21 | 32 | 21 | 5 | 14 | 28 | 28 | 7 | 0 |
| 6 | 24 | 35 | 24 | 6 | 16 | 32 | 32 | 16 | 0 | 5 | 21 | 32 | 21 | 5 | 14 | 28 | 28 | 7 | 0 |
| 4 | 16 | 24 | 16 | 4 | 10 | 21 | 21 | 10 | 0 | 3 | 10 | 16 | 10 | 3 | 7  | 14 | 14 | 7 | 0 |
| 1 | 4  | 6  | 4  | 1 | 3  | 5  | 5  | 3  | 0 | 0 | 0  | 0  | 0  | 0 | 0  | 0  | 0  | 0 | 0 |

Although the basis for generation of these kernels was the organization depicted in FIG. 3, the discussion that follows is based on the organization depicted in FIG. 2, so the kernels referred to below are not the ones set forth above. The principle of their generation is the same, but all four result from convolution with a bilinear-interpolation matrix.

The result of the approach outlined above is to enable the interpolation to be performed implicitly; the interpolation is performed as part of the filtering step in the real-time operations, and the operations dedicated to interpolations specifically are performed when the kernels themselves are generated, i.e., in an operation that only has to be performed once, before the data are actually being processed.

Figure 4:
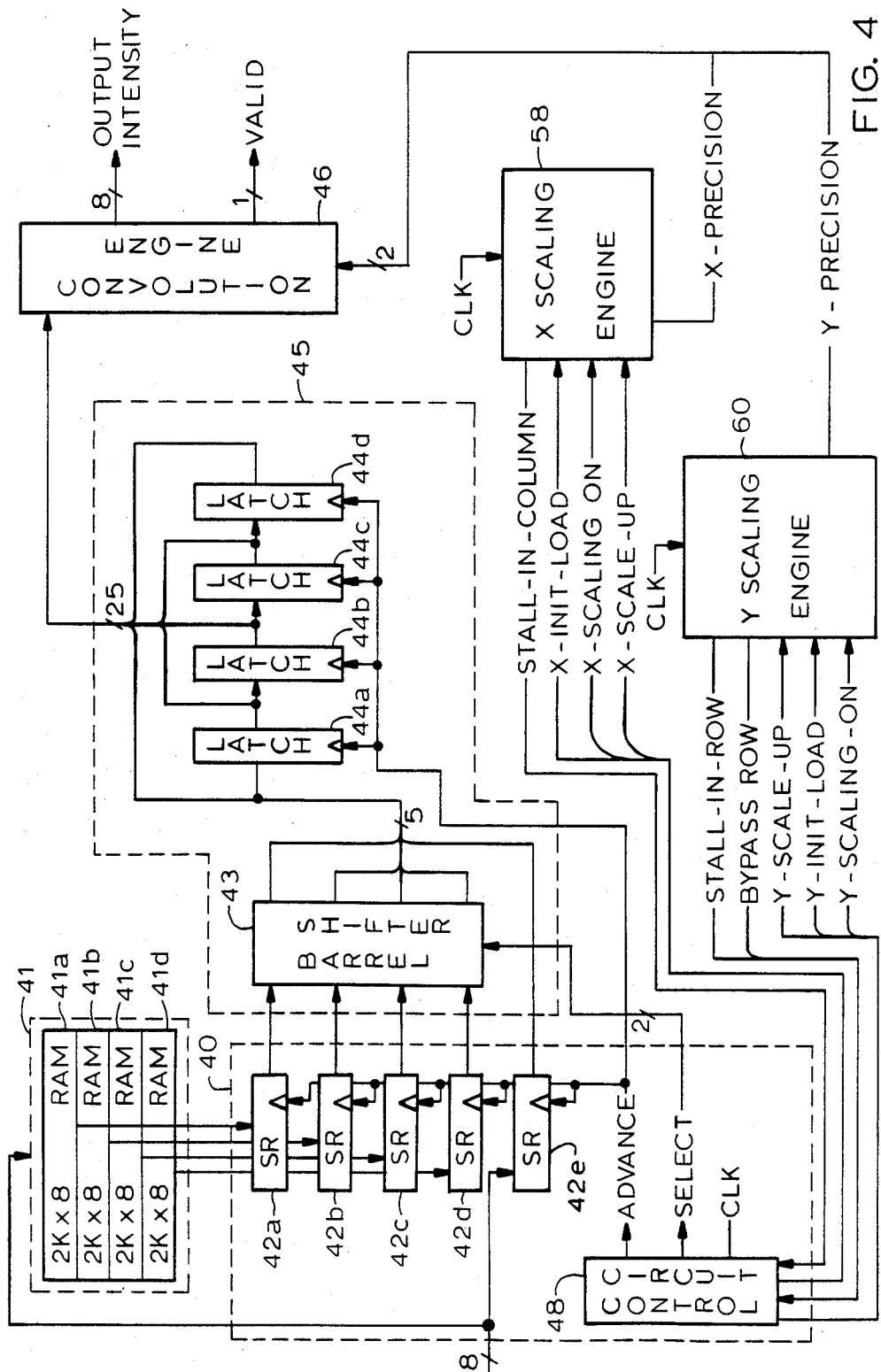
FIG. 4 is a block diagram of one embodiment of the present invention.

FIG. 4 depicts hardware employed to carry out these functions. Omitted for the sake of simplicity are features not germane to the invention. Among such features are the elements used to generate the border output intensities, for which the input submatrices are incomplete. Although the apparatus includes circuitry for implementing this expedient, such circuitry is omitted from the drawings for the sake of simplicity. The drawings therefore depict the elements concerned with generating the bulk of the output image.

In FIG. 4, a scan-line interface 40 generates address and control signals for fetching bitonal intensity information one byte (i.e., eight pixels' worth) at a time from a source of such information. For high-resolution bitonal images, such a source is typically a decompression circuit, which reconstitutes image data from the data-reduced format in which they are usually transmitted and stored.

Each time of the scan-line interface 40 fetches a byte of intensity data, that byte is also stored in one of four scan-line buffers 41a–d. Each of the buffers stores a different previously received complete scan line of data, and the byte currently being received is stored in the scan line having the oldest data. It displaces the corresponding byte four scan lines before, and the buffer in which it is stored therefore contains all of the data representing locations to the left of the current eight locations in the current scan line and all data representing locations to the right in the scan line four scan lines before.

One of four shift registers 42a–d receives the byte that the currently received byte has displaced from the scan-line buffer, while a fifth shift register 42e receives the currently received byte simultaneously with its reception by the scan-line buffer. At the same time, each of the other scan-line buffers sends the corresponding bytes from the three intervening scan lines to the remaining three of the four shift registers 42a–d so that the shift registers 42a–e together contain eight columns of data from five scan lines. Since eight pixels' worth of data are fetched from the scan-line buffers at a time, the counters (not shown) that generate the addresses for those buffers only have to operate at one-eighth the pixel rate. This is important because the counters have to be relatively large, and thus slow, and their operating rate would be a serious constraint on overall apparatus operation if they had to operate at the pixel rate.

Each shift register 42 contains data from a different scan line. Shift register 42e always represents the bottom scan line, but the order of the scan lines that the other shift registers represent changes each time a new scan line begins. Accordingly, the scan-line interface 40 sends a two-bit SELECT signal to a barrel shifter 43, which receives the serial output of the four shift registers 42a–d and reorders them in accordance with the order of the scan lines that they represent. The scan-line interface 40 provides a two-bit SELECT signal to the barrel shifter to indicate the proper order.

The output of the barrel shifter 43, together with the serial output of the last shift register 42e, is sent to the first of four five-bit latches 44a–d configured as a four-stage, five-bit shift register. As a result of this arrangement, each shift-register stage contains a different one of four columns of a five-column submatrix, while the outputs of the barrel shifter and the last shift register 42e represent the fifth column. A convolution engine 46 receives those outputs in parallel with the output of all four shift registers 44a–d and convolves the submtrix that they represent with a stored kernel each time the scan-line interface strobes the convolution engine 46 with a CLK signal.

The CLK signal is generated by control circuitry 48 in the scan-line interface 40. The control circuitry generates addresses for fetching and storing and performs many other control functions, which, not being part of the invention, will not be described here.

Additionally, however, the control circuitry 48 generates an ADVANCE signal, which controls the advance of data through the shift registers 42a–e and the latches 44a–d. Although it takes five ADVANCE pulses for the latches 44a–d, the barrel shifter 43, and the last shift register 42 to accumulate the data for a complete 5×5 submatrix, the convolution engine 46 receives a complete 5×5 submatrix on each ADVANCE pulse, because each submatrix overlaps the previous submatrix by four columns. ADVANCE is largely a gated version of CLK; whenever it occurs, it coincides with CLK, but CLK is sometimes unaccompanied by ADVANCE when the apparatus is being used to increase resolution. The reason for this that resolution increases require that the convolution engine 46 sometimes convolve more than once with the same submatrix.

The convolution engine 46 includes a memory for storing the elements of each of the kernels that it is to employ. The particular kernel that it employs is specified by X-PRECISION and Y-PRECISION signals produced by an X scaling engine 58 and a Y scaling engine 60, respectively. These engines will be described in more detail in connection with FIGS. 5 and 6.

The particular convolution engine 46 used in the illustrated embodiment is arranged to provide half-pixel precision in the manner described above, and it has memories containing the four kernels used to achieve this precision. Of course, other degrees of sub-pixel precision could be employed, so other embodiments may use other numbers of kernels; quarter-pixel precision, for instance, would require sixteen different kernels.

The twenty-five elements of the 5×5 submatrix with which the convolution engine 46 is to convolve are represented by twenty-five one-bit signals from the latches 44a–d, the last shift register 42e, and the barrel shifter 43. Within the convolution engine 46, these submatrix-element signals gate the elements of the particular kernel specified by the X-PRECISION and Y-PRECISION signals into a sequence of adder circuits and thereby multiply those kernel elements by 1 or 0. The adder circuits generate the sum of the "multiplication" products. The summation of all 25 elements requires five CLK pulses, but the summation operations are pipelined so that new sums are produced at one-clock-pulse intervals.

The convolution engine also produces a VALID signal. In resolution reduction, the ADVANCE and CLK signals are equivalent, since the ADVANCE signal skips CLK pulses only on resolution increases, and the convolution engine 46 therefore performs a convolution on each submatrix. However, resolution reduction requires that some submatrices result in no output intensities, so not all of the outputs of the convolution engine 46 should be used. The VALID signal indicates the ones that should be. It is essentially a delayed version of a VALID-CONVOLVE signal generated by the X scaling engine, which will now be described.

Figure 5:
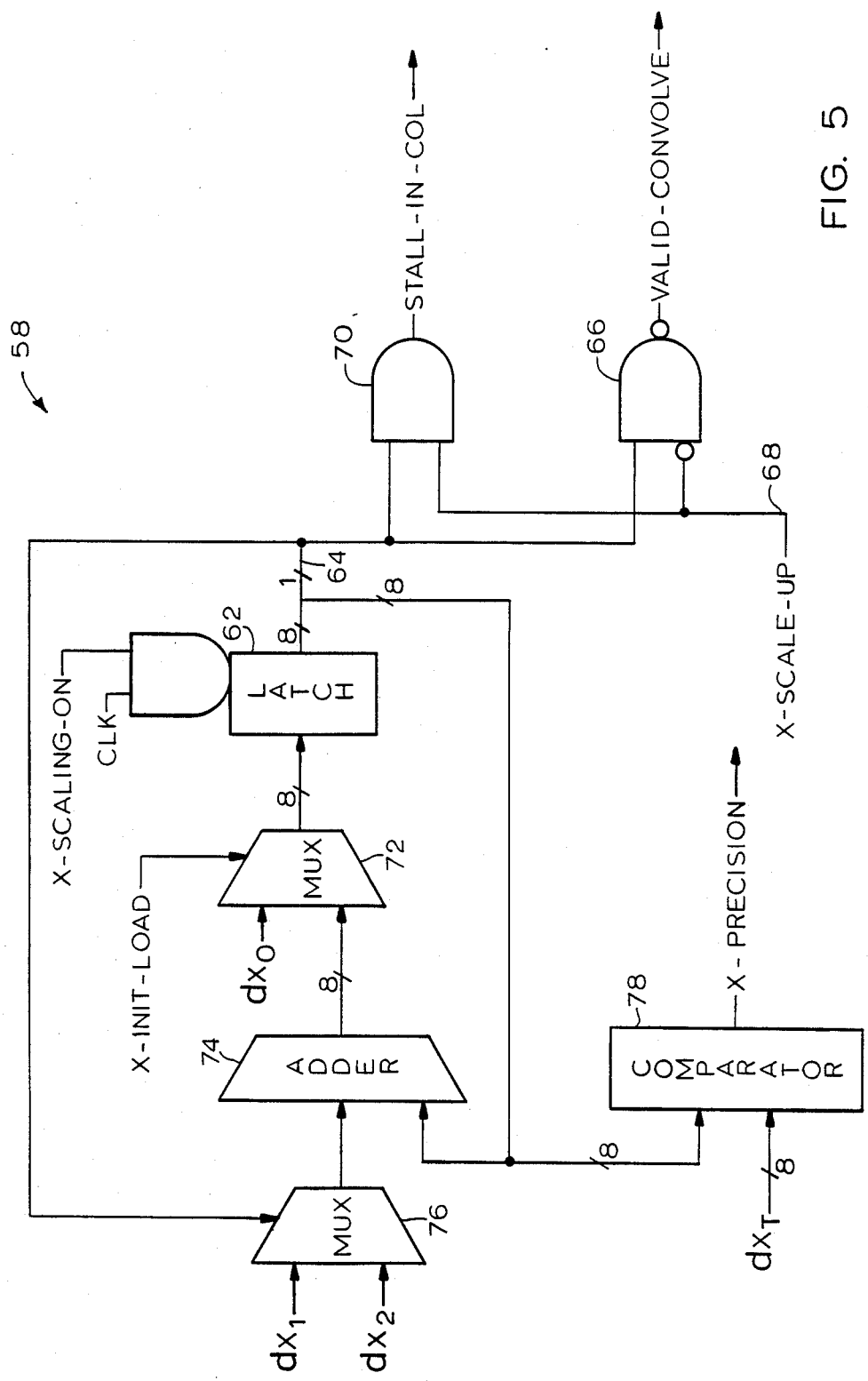
FIG. 5 is a block diagram of the x scaling engine of FIG. 4.

FIG. 5 depicts the X scaling engine 58. The X scaling engine 58 receives an X-SCALE-UP signal from the scan-line interface 40. This is a one-bit signal that indicates whether the scaling in the X direction is to be up or down; that is, it indicates whether the output image representation is to have more pixels or fewer pixels than the input representation.

When X-SCALE-UP has a binary values of zero, designating down-scaling, the purpose of the X scaling engine 58 is to indicate whether the convolution-engine output represents a valid output intensity. The X scaling engine 58 actually operates eight CLK signals ahead of the convolution engine; its VALID-CONVOLVE signal actually indicates the validity of the convolution output eight cycles later. The avoid encumbering the description excessively, however, we will describe the operation of the X scaling engine as though it occurred eight CLK cycles later than it actually does. Therefore, we will say that the VALID-CONVOLVE signal indicates whether the *current* convolution-engine output is valid.

Suppose, now, that the convolution engine 46 initially generates an output that represents the convolution of a selected kernel with a submatrix centered on input location 14c of FIG. 1. The output of this convolution is a valid output intensity value, since an output location 16b falls within half an input-pixel width of input location 14c, and the X scaling engine indicates this by generating the VALID-CONVOLVE signal at a true level.

The convolution engine 46 generates its next output from a submatrix centered on input location 14d. VALID-CONVOLVE again assumes a true level, since output location 16c is within half an input pixel of input location 14d.

When the convolution engine 46 produces its next output, however, which is generated from a submatrix centered on input location 14e, the output of the convolution engine 46 is not a valid output intensity value, because the next output location 16*d* is separated from input location 14*e* by more than half an input pixel. Therefore, the X scaling engine 58 generates a false VALID-CONVOLVE signal, and the convolution engine 46 accordingly sends a false-level VALID signal to indicate that its current output should not be interpreted as an output intensity value.

When the convolution engine 46 processes the next submatrix, the resultant output is a valid output intensity, and the VALID-CONVOLVE signal therefore resumes it true level.

When X-SCALE-UP has a binary value of one, designating up-scaling, the purposes of the X scaling engine 58 is to determine when to generate a STALL-IN-COLUMN signal, which it sends to the control circuit 48 to prevent it from accompanying the next CLK signal with an ADVANCE signal—i.e., to prevent it from changing, as it ordinarily does, the submatrix that the convolution engine 46 receives before the next convolution operation. The effect of sending the STALL-IN-COLUMN signal is thus to cause the convolution engine 46 to convolve with the submatrix with which it previously convolved. Although it convolves with the same submatrix when a true-level STALL-IN-COLUMN signal is generated, it does not in general convolve with the same kernel, so it may generate a different output.

The heart of the X scaling engine 58 of FIG. 5 is a latch 62, which contains a value that represents the difference between the x coordinate of the current output location and the right perimeter of the pixel on which the current submatrix is centered. The latch 62 stores this value as the result of two's-complement arithmetic, so the most-significant bit of the output is a 1 if that result is negative and a 0 if it is positive. A positive value results from subtracting the x coordinate of output location 16*b* from the x coordinate of the right periphery of the pixel centered on input location 14*c;* output location 16*b* is positioned within the pixel centered on location 14*c*. Thus, the most-significant bit of the difference value stored in latch 62 is zero, and the signal line 64 carrying the most-significant bit therefore disables the NAND gate 66 that generates the VALID-CONVOLVE signal. The VALID-CONVOLVE signal is therefore true and thus indicates that the convolution output is valid.

Later on, however, when the submatrix is centered on input location 14*e,* the signal carried by line 64 is a 1, indicating that output location 16*d* is positioned to the right of the input pixel in which input location 14*e* is centered. Therefore, NAND gate 66 is enabled by the combination of the signal on line 64 and the inverted signal on line 68, which carries the false level of the X-SCALE-UP signal. The VALID-CONVOLVE signal is therefore false and thus indicates that the convolution output should not be used.

The false level of the X-SCALE-UP signal on line 68 keeps an AND gate 70 constantly disabled during down-scaling, so the STALL-IN-COLUMN signal continuously remains low.

In order to understand the manner in which the contents of latch 62 are updated, it is helpful to consider a possible format in which the image coordinates may be stored. Suppose that there are $M+1$ input locations in row and $N+1$ output locations in a row. In the organization described above, in which the first and last input locations on the first row coincide with the first and last output locations on the first row, the interval between the first and last locations in the row is broken up into 2NM subintervals; the x coordinate of the first input/output location in the first row is zero and the coordinate of the last input/output location in the first row is 2NM.

Since the $M+1$ input locations divide the interval into M parts, the distance between two input locations is 2N, and the x coordinate of the point halfway between the first two input locations is thus N. The X scaling engine 58 includes a register (not shown) containing this N value, and the output of this register is fed to a multiplexer 72 as the value $dx_0$. At the beginning of each line, the scan-line interface 40 applies an X-INIT-LOAD signal to the multiplexer 72 as its select signal so that multiplexer 72 forwards the $dx_0$ value to the latch 62 at the beginning of a scan line. On the first CLK pulse in a scan line, therefore, the latch 62, which is ordinarily enabled by an X-SCALING-ON signal from the scan-line interface 40, latches in the $dx_0$ value.

On every subsequent clock pulse, the scan-line interface 40 applies the other value of the X-INIT-LOAD signal so as to cause the multiplexer 72 to forward the output of an adder 74 rather than $dx_0$.

As a result of the first clock pulse, therefore, the output of latch 62 is equal to the x coordinate of the first pixel boundary, namely, N, minus the x coordinate of the first output location, which is zero. Since this difference, N, is a positive number, the most-significant bit of the latch-62 output is a zero, so the false level on line 64 disables NAND gate 66. The VALID-CONVOLVE signal accordingly indicates that the output of the convolution engine 46 should be considered a valid output intensity.

The adder receives as its two inputs the outputs of the latch 62 and a multiplexer 76. The select signal applied to multiplexer 76 is the most-significant bit of the latch-62 output. Since the most-significant bit is zero, the multiplexer 76 forwards a stored value $dx_2$. For down-scaling, $dx_2$ equals $2N-2M$, which is the difference between the input inter-pixel spacing and the output inter-pixel spacing. Accordingly, the adder 74 in effect adds the input inter-pixel spacing to the x coordinate of the last pixel boundary to find the x coordinate of the next pixel boundary and subtracts from that the output inter-pixel spacing so as to compute the difference between the x coordinate of the new output location and the x coordinate of the new input-pixel boundary. The multiplexer 72 now forwards this adder output to the latch 62, the most-significant bit of whose output indicates whether the output location is inside or outside the pixel represented by the center element of the submatrix that the convolution engine 46 is currently receiving.

As this operation is repeated, the most-significant bit of the latch-62 output eventually becomes a 1, indicating that the output location is now beyond the input-pixel boundary. When this occurs, the multiplexer 76 forwards another stored value $dx_1$ to the adder 74. In the case of downscaling, the value of $dx_1$ is simply 2N, namely, the input inter-pixel spacing. That is, an input inter-pixel spacing is added without subtracting an output inter-pixel spacing; i.e., the pixel boundary is moved by one pixel, but the output location remains the same. This coincides with the low VALID-CONVOLVE signal, which indicates that a valid new intensity value is not present. In other words, the x coordinate of the output location is advanced only when a valid output intensity value is produced.

Note that, although the scaling circuitry computes *differences* in x coordinates for each convolution, it does not have to compute the actual x coordinates themselves explicitly. This is important because such coordinates can be quite large for high-resolution images, and dealing with numbers that large would seriously slow the scaling process.

As was mentioned before, the X scaling engine 58 also generates the X-PRECISION signal, which, together with the Y-PRECISION signal, determines which kernel the convolution engine 46 is to use. The X-PRECISION signal determines whether the convolution engine 46 is to use kernel $K_{UL}$ or $K_{LL}$, on the one hand, or kernel $K_{UR}$ or $K_{LR}$, on the other hand. As was previously described in connection with FIG. 2, $K_{UL}$ or $K_{LL}$ is used if the x coordinate of the output location is less than that of the input location, while $K_{UR}$ or $K_{LR}$ is used if the x coordinate of the output location is greater than or equal to the x coordinate of the input location.

Another way of stating this is that $K_{UL}$ or $K_{LL}$ is used if the x coordinate of the pixel boundary exceeds that of the output location by more than half an input interpixel spacing. It is this test that a digital comparator 78 performs. It compares a stored threshold value $dx_T$—which is N for the particular sub-pixel division illustrated in FIG. 2—with the output of latch 62, and it presents the result to the convolution engine 46 as the X-PRECISION signal. This value is zero if the output location is to the left of the input location, and it is one if the output location is to the right of the input location.

As was stated above, the X scaling engine 58 is used both for scaling up and for scaling down. The operations in the two cases are similar, but they use different values of the parameters $dx_0$, $dx_1$, $dx_2$, and $dx_T$. Additionally, the X-SCALE-UP signal is true for up-scaling so as to keep the VALID-CONVOLVE signal true but cause the STALL-IN-COLUMN signal to depend on the most-significant bit of the latch-62 output.

To understand the parameters employed for scaling up, it is important to appreciate a basic difference between the down-scaling determination of whether the current convolution output is valid and the up-scaling determination of whether a new submatrix should be used for the convolution. In down-scaling, the question is whether the output location in the *current* is beyond the *right* boundary of the pixel on which the current submatrix window is centered. If so, the current convolution output is not valid, and the submatrix window should be moved one pixel to the right without moving the output location.

In scaling up, on the other hand, the question is whether moving the submatrix window one pixel to the right would cause its center pixel to be positioned beyond the output location during the *next* cycle. If so, the output pixel should be advanced without advancing the submatrix window. Therefore, the quantity contained in latch 62 is the difference between the x coordinate of the *next* output location and the x coordinate of the *left* boundary of the pixel one pixel to the right of that on which the current submatrix window is centered. Initially, therefore, the latch 62 must be loaded with the value $2M-N$; 2M is the x coordinate of the next output location, while N is the x coordinate of th left boundary of the pixel on which the submatrix will be centered if it is moved one pixel to the right. Therefore, $dx_0$ is $2M-N$ for scaling up.

If the most-significant bit of the latch-62 output is zero, then advancement of both the output pixel and the submatrix will result in a situation in which the output location remains in the center pixel. Accordingly, the scan-line interface 40 should supply a new column, and the data-alignment circuit 44 should supply a new submatrix. The STALL-IN-COLUMN signal therefore assumes a false level. Furthermore, the multiplexer 76 should add one output-pixel spacing and subtract one input-spacing. Therefore, for scaling up, the value of $dx_2$ is $2M-2N$.

If the most-significant bit of the latch-62 output is a one, indicating that advancement of the submatrix window would cause its center pixel to advance beyond the position of the next output location, the submatrix window should not be advanced, so the STALL-IN-COLUMN signal assumes a true value to prevent the scan-line interface 40 from supplying a new column and to prevent the data-alignment circuit 44 from supplying a new submatrix. Thus, only the output location is advanced, so the adder 74 should add an output-location spacing but not substract an input-pixel spacing. The $dx_1$ value for scaling up is therefore 2M.

The up-scaling and down-scaling tests for which pair of kernels to employ are the same: is the current output location to the left of or to the right of the center of the central pixel of the current submatrix window? The comparator 78 must determine this from the output of latch 62. As was stated above, this output indicates how far the next output location is to the right of the *left* boundary of the center pixel of the *next* submatrix window. Another way of stating this is that the latch-62 output indicates how far the next output location is to the right of the *right* boundary of the center pixel of the *current* submatrix. By adding N to this quantity, one obtains a value that represents how far the next output location is to the right of the input location at the center of the current window, and subtracting 2M from that value indicates how far to the right of that input location the *current* output location is. This is the test quantity. Accordingly, the digital comparator 78 compares 2M-N with the output of latch 62, and the X-PRECISION signal is generated as before.

FIG. 6 depicts the Y scaling engine 60. Its elements are essentially the ame as those of the X scaling engine, and the reference numerals of parts in FIG. 6 differ from those of their corresponding parts in FIG. 5 by 100. The operation of the engine itself is the same, and the parameters $dy_0$, $dy_1$, $dy_2$, and $dx_T$ employed by the Y scaling engine are the same as the corresponding parameters $dx_0$, $dx_1$, $dx_2$, and $dx_T$ of FIG. 5 if, as is typical, the X and Y scaling factors are the same. If the scaling factors are different—i.e., if the Y scaling factor is N'/M' rather than N/M—then M' and N' are substituted for M and N in the definitions of the parameters. Note that the X scaling engine 58 can be used for up-scaling while the Y scaling engine 60 is used for down-scaling, and vice versa.

The major differences between the X and Y scaling engines 58 and 60 lie in the ways in which their output signals are used. After the scan-line interface 40 has operated the convolution engine 46 to generate an entire scan line of output-pixel intensities in the manner just described, it changes the value of an X-SCALING-ON signal so as to interrupt the operation of the X scaling engine, and it asserts a Y-SCALING-ON signal for one CLK pulse to operate the Y scaling engine 60.

If the apparatus is scaling down in the Y direction, the scan-line interface 40 will always have been storing a new scan line in one of the scan-line buffers 42a–d by displacing bytes in that buffer with the incoming bytes. At the end of the output scan line, the Y scaling engine 60 then indicates whether the new set of scan lines that results from replacing the oldest scan line with the scan line just read from the frame buffer should be used to form submatrices for convolution. The outputs of AND gate 166 generates a BYPASS-ROW signal to generate this indication in a manner the same as that in which the NAND gate 66 of FIG. 5 indicated whether the newly formed submatrix should be used to generate a new output intensity. If BYPASS-ROW assumes a false level, the apparatus proceeds to generate an output row in the manner described above.

A true level of the BYPASS-ROW signal, on the other hand, prevents generation of another output row. The scan-line interface 40 reads in a new scan line in the manner described above, but the convolution engine 46 does not generate outputs at the same time. When the new scan line has been loaded the Y-SCALING-ON signal is again asserted for one clock pulse, and the Y scaling engine 60 determines whether the convolution engine should generates output intensity values as the next scan line is loaded.

When the Y scaling engine is used for scaling up instead of scaling down, the BYPASS ROW signal always assumes a false level, and the convolution engine 46 generates output intensities as every scan line is loaded. For up-scaling, it is the STALL-IN-ROW signal that depends on the most-significant bit of the latch-62 output. This signal indicates whether the next output scan line should be generated from the currently stored input scan lines. If so, STALL-IN-ROW assumes a true level, and the control circuit 48 responds to it by refraining from fetching a new scan line of data from the source during generation of the next scan line of output intensities. The result is that shifter register 42e contains no valid data during generation of that scan line, so the bottom row of each submatrix used to generate its output intensities is not meaningful. Kernels used for up-scaling should therefore have only zeroes in their bottom rows, but this is acceptable since up-scaling ordinarily involves only interpolation, for which the implementing kernel is typically 2×2.

Accordingly, the convolution engine generates a second scan line of output data from essentially the same scan lines of input data, even though the bottom line is not available during the second scan. The Y-PRECISION signal is not in general the same during the generation of the second scan line, however, so the intensity values in the second output scanline are not in general the same as those in the first.

The illustrated arrangement has a wide range of applications. By a simple change of the parameters $dx_0$, $dx_1$, $dx_2$, and $dx_T$, together with changes in the kernels, different scale factors and different formats for sub-pixel precision can be employed. Furthermore, although the above example was based on the assumption of M+1 input locations and N+1 output locations, the parameters given in the example can be applied in any scale change in which the ratio is N/M, i.e., for any conversion from nM+1 to nN+1 pixels.

Additionally, although only a single comparator 78 or 178 was used in each of the scaling engines so that only a two-bit signal designated the kernel with which to convolve, more comparators, with more than one threshold value $dx_T$, could be used instead to choose among more than four kernels for finer inter-pixel precision.

It is thus apparent that the present invention provides a high degree of flexibility while providing significant operational advantages. Since it generates only position difference, and not complete input-location addresses, at the rate at which output intensity values are produced, it can operate very rapidly. Moreover, since it retains more than a single bit of resolution from the intensity calculation, it can reduce the apparent jaggedness with which discrete images are unavoidably afflicted. And by using more than one pixel for convolution, it obtains the benefits of interpolation without incurring the time penalty that explicit interpolation wound entail. The present invention therefore constitutes a significant advance in the art.

What is claimed as new and desired to be secured by Letters Patent of the United States is:

1. For generating output intensity signals representing the intensities in an image at output locations in an array of output locations from input-data signals representing input data associated with input locations in an array of input locations in the same image, each input location having associated therewith a location neighborhood defined by location boundaries in the image, and each output intensity value being generated from the input data associated with the input location in whose location neighborhood that output location is positioned, an apparatus comprising:
  A. output-intensity means, operating in location cycles and adapted to receive during each location cycle input-data signals representing the input data associated with an input location, for processing the input data represented by the input-data signals applied thereto to generate output intensity signals representing the intensity of the image at an output location therein;
  B. advancement means, adapted to receive a stall-in-column signal that assumes alternatively an advance value and a stall value, the advancement means operating in each location cycle to apply to the output-intensity means (a) when the stall-in-column signal assumes the stall value, input-data signals representing the input data associated with the input location whose data it applied during the previous location cycle and (b) when the stall-in-column signal assumes the advance value, input-data signals representing the input data associated with the next input location; and
  C. an X scaling engine comprising:
    (i) X relative-position means, adapted to receive an X update signal representing an X update value, for storing the X update value as a relative-position quantity representing the difference in position between a given output location and a location boundary of the location neighborhood associated with a given input location and for producing an X relative-position signal representing the stored relative-position quantity and thereby indicating whether the given output location is inside or outside the location neighborhood associated with the given input location;
    (ii) X increments means, responsive to the X relative-position signal, for producing an X increment output representing, (a) when the X relative-position signal indicates that the given output location is within the location neighborhood associated with the given input location, the amount by which the relative positions of the given input and output locations will change if the given input and output locations are both advanced by one location and, (b) when the X relative-position signal indicates that the given output location is outside the location neighborhood associated with the given input location, the amount by which the relative positions of the given input and output locations will change if only the given output location is advanced by one location;

(iii) an X adder responsive to the X increment and relative-position signals for generating and applying to the X relative-position means as the X update signal a signal representing the sum of the quantities represented by the X increment and relative-position signals; and (iv) X stall-in-column-signal means responsive to the X relative-position signal for generating and applying to the advancement means a stall-in-column signal that assumes the advance value when the relative-position signal indicates that the given output location is within the location neighborhood associated with the given input location and that assumes the stall value when the relative-position signal indicates that the given output location is outside the location neighborhood associated with the given input location.

2. An apparatus as defined in claim 1 wherein:

A. the data associated with each input location consists of a submatrix of intensity values representing the intensities in the image at each input location in an input-array subarray associated with that input location; and B. the output-intensity means generates each output intensity value by mutliplying a convolution kernel element-by element by the submatrix associated with an input location.

3. An apparatus as defined in claim 2 wherein:

A. each location neighborhood consists of a plurality of sub-neighborhoods defined by sub-neighborhood boundaries;

B. the apparatus comprises sub-neighborhood means for receiving the relative-position signal and generating therefrom a sub-neighborhood signal indicating the sub-neighborhood in which the given output location is positioned; and C. the output-intensity means associates different kernels with different sub-neighborhoods in the same neighborhood and is responsive to the sub-neighborhood signal to multiply the submatrix by the kernel associated with the sub-neighborhood that the sub-neighborhoood signal indicates.

4. An apparatus as defined in claim 3 wherein:

A. the arrays of input and output locations are organized into input rows and columns and output rows and columns, respectively, each input row having associated therewith a row neighborhood consisting of the location neighborhoods associated with the input locations in that input row and being defined by row boundaries consisting of location boundaries that define the location neighborhoods associated with the input locations in that input row;

B. the output-intensity means operates in row cycles, is adapted to receive during each row cycle input-data signals representing the input data associated with the input locations in an input row, and processes the input data represented by the input-data signals applied thereto during a row cycle to generate the output intensity signals representing the intensity values for the output locations in an output row;

C. the advancement means is adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input location in the input row whose data it applied during the previous row cycle and, (b) when the stall-in-row signal assumes the advance value, input-data signals representing the input data associated with the input locations in the next input row;

D. the apparatus further comprises a Y scaling engine comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output representing, (a) when the Y relative-position signal indicates that the given output row is within the row neighborhood associated with the given input row, the amount by which the relative positions of the given input and output rows will change if the given input and output rows are both advanced by one row and, (b) when the Y relative-position signal indicates that the given output row is outside the row neighborhood associated with the given input row, the amount by which the relative positions of the given input and output rows will change if only the given output row is advanced by one row;

(iii) a Y adder reponsive to the Y increment and relative-position signals for generating and applying to the relative-position means as the Y update signal a signal representing the sum of the quantities represented by the Y increment the relative-position signals; and (iv) stall-in-row-signal means responsive to the Y relative-position signal for generating and applying to the advancement means a stall-in-row signal that assumes the advance value when the Y relative-position signal indicates that the given output row is within the row neighborhood associated with the given input row and that assumes the stall value when the Y relative-position signal indicates that the given output row is outside the row neighborhood associated with the given input row; and E. the sub-neighborhood means receives both the X and the Y the relative-position signals and generates the sub-neighborhood signal therefrom.

5. An apparatus as defined in claim 4 wherein:

A. the X scaling engine is operable alternatively in an expansion mode and in a reduction mode;
B. the X increment output that the X increment means produces when the X relative-position signal indicates that the given output location is outside the location neighborhood associated with the given input location is (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode;
C. the X stall-in-column-signal means:
  (i) assumes the advance value whenever the X scaling engine is in its reduction mode; and
  (ii) whenever the X scaling engine is in its expansion mode, assumes the advance value when the X relative-position sigal indicates that the given output location is within the location neighborhood associated with the given input location and assumes the stall value when the X relative-position signal indicates that the given output location is outside the neighborhood of the given input location;
D. the X scaling engine further includes validity-signal means responsive to the X relative-position signal for generating a validity signal that:
  (i) assumes a valid value whenever the X scaling engine is in the expansion mode; and
  (ii) whenever the X scaling engine is in the reduction mode, assumes the valid value when the X relative-position signal indicates that the given output location is within the location neighborhood associated with the given input location and assumes an invalid value when the X relative-position signal indicates that the given output location is outside the location neighborhood associated with the given input location; and
E. the output-intensity means is responsive to the validity signal to generate the output intensity signals representing the intensity at the next output location (i) from the input data associated with the next input location if the validity signal associated with the next input location has the valid value and (ii) from the input data associated with a subsequent input location if the validity signal associated with the next input location has the invalid value.

6. An apparatus as defined in claim 1 wherein:
A. the arrays of input and output locations are organized into input rows and columns and output rows and columns, respectively, each input row having associated therewith a row neighborhood consisting of the location neighborhoods associated with the input location in that input row and being defined by row boundaries consisting of location boundaries that define the location neighborhoods associated with the input locations in that input row;
B. the output-intensity means operates in row cycles, is adapted to receive during each row cycle input-data signals representing the input data assocated with the input locations in an input row, and processes the input data represented by the input-data signals applied thereto during a row cycle to generate the output intensity signals representing the intensity values for the output locations in an output row;
C. the advancement means is adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input location in the input row whose data it applied during the previous row cycle and, (b) when the stall-in-row signal assumes the advance value, input-data signals representing the input data associated with the input locations in the next input row; and
D. the apparatus further comprises a Y scaling engine comprising:
  (i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;
  (ii) Y increment means, responsive to the Y relative-position signal, for producing a Y increment output representing, (a) when the Y relative-position signal indicates that the given output row is within the row neighborhood associated with the given input row, the amount by which the relative positions of the given input and output rows will change if the given input and output rows are both advanced by one row and, (b) when the Y relative-position signal indicates that the given output row is outside the neighborhood of the given input row, the amount by which the relative positions of the given input and output rows will change if only the given output row is advanced by one row;
  (iii) a Y adder responsive to the Y increment and relative-position signals for generating and applying to the relative-position means as the Y update signal a signal representing the sum of the quantities represented by the Y increment and relative-position signals; and
  (iv) Y stall-in-row-signal means responsive to the Y relative-position signal for generating and applying to the advancement means a stall-in-row signal that assumes the advance value when the Y relative-position signal indicates that the given output row is within the row neighborhood associated with the given input row and that assumes the stall value when the Y relative-position signal indicates that the given output row is outside the row neighborhood associated with the given input row.

7. An apparatus as defined in claim 6 wherein:
A. the X scaling engine is operable alternatively in an expansion mode and in a reduction mode;
B. the X increment output that the X increment means produces when the X relative-position signal indicates that the given output location is outside the location neighborhood associated with the given input location is (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode;

C. the X stall-in-column-signal means:
  (i) assumes the advance value whenever the X scaling engine is in its reduction mode; and
  (ii) whenever the X scaling engine is in its expansion mode, assumes the advance value when the X relative-position signal indicates that the given output location is within the location neighborhood associated with the given input location and assumes the stal value when the X relative-position signal indicates that the given output location is outside the neighborhood of the given input location;

D. the X scaling engine further includes validity-signal means responsive to the X relative-position signal for generating a validity signal that:
  (i) assumes a valid value whenever the X scaling engine is in the expansion mode; and
  (ii) whenever the X scaling engine is in the reduction mode, assumes the valid value when the relative-position signal indicates that the given output location is within the location neighborhood associated with the given input location and assumes an invalid value when the relative-position signal indicates that the given output location is outside the location neighborhood associated with the given input location; and E. the output-intensity means is responsive to the validity signal to generate the output intensity signals representing the intensity at the next output location (i) from the input data associated with the next input location if the validity signal associated with the next input location has the valid value and (ii) from the input data associated with a subsequent input location if the validity signal associated with the next input location has the invalid value.

8. An apparatus as defined in claim 1 wherein:
A. the X scaling engine is operable alternatively in an expansion mode and in a reduction mode;
B. the X increment output that the X increment means produces when the X relative-position signal indicates that the given output location is outside the location neighborhood associated with the given input location is (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode;
C. the X stall-in-column-signal means:
  (i) assumes the advance value whenever the X scaling engine is in its reduction mode; and
  (ii) whenever the X scaling engine is in its expansion mode, assumes the advance value when the X relative-position signal indicates that the given output location is within the location neighborhood associated with the given input location and assumes the stall value when the X relative-position signal indicates that the given output location is outside the neighborhood of the given input location;
D. the X scaling engine further includes validity-signal means responsive to the relative-position signal for generating a validity signal that:
  (i) assumes a valid value whenever the X scaling engine is in the expansion mode; and
  (ii) whenever the X scaling engine is in the reduction mode, assumes the valid value when the relative-position signal indicates that the given output location is within the location neighborhood associated with the given input location and assumes an invalid value when the relative-position signal indicates that the given output location is outside the location neighborhood associated with the given input location; and
E. the output-intensity means is responsive to the validity signal to generate the output intensity signals representing the intensity at the next output location (i) from the input data associated with the next input location if the validity signal associated with the next input location has the valid value and (ii) from the input data associated with a subsequent input location if the validity signal associated with the next input location has the invalid value.

9. For generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity value being generated from the input data associated with the input location in whose neighborhood that output location is positioned, an apparatus comprising:

A. output-intensity means, operating in row cycles and adapted to receive during each row cycle input-data signals representing the input data associated with the input locations in an input row, for processing the input data represented by the input-data signals applied thereto during a row cycle to generate output intensity signals representing the intensities of the image at the output locations in a row of output locations therein;

B. advancement means, adapted to receive a stall-in-row signal that alternatively assumes an advance value and a stall value, the advancement means operating in each row cycle to apply to the output-intensity means, (a) when the stall-in-row signal assumes that stall value, input-data signals representing the input data associated with the input locations in the input row whose data it applied during the previous row cycle and, (b) when the stall-in-row signal assumes the advance value, input-data signals representing the input data associated with the input locations in the next input row; and C. a Y scaling engine comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output representing, (a) when the Y relative-position signal indicates that the given output row is within the row neighborhood of the given input row, the amount by which the relative positions of the given input and output rows will change if the given input and output rows are both advanced by one row and, (b) when the Y relative-position signal indicates that the given output row is outside the row neighborhood of the given input row, the amount by which the relative positions of the given input and output rows will change if only the given output row is advanced by one row;

(iii) a Y adder responsive to the Y increment and relative-position signals for generating and applying to the relative-position means as the Y update signal a signal representing the sum of the quantities representing by the Y increment and relative-position signals; and (iv) Y stall-in-row-signal means responsive to the Y relative-position signal for generating and applying to the advancement means a stall-in-row signal that assumes the advance value when the Y relative-position signal indicates that the given output row is within the row neighborhood associated with the given input row and that assumes the stall value when the Y relative-position signal indicates that the given output row is outside the row neighborhood associated with the given input row.

10. An apparatus as defined in claim 9 wherein:
A. the data associated with each input location consists of a submatrix of intensity values representing the intensities in the image at each input location in an input-array subarray associated with that input location; and
B. the output-intensity means generates each output intensity value by multiplying a convolution kernel element-by-element by the submatrix associated with an input location.

11. An apparatus as defined in claim 10 wherein:
A. each location neighborhood consists of a plurality of sub-neighborhoods defined by sub-neighborhood boundaries;
B. the apparatus comprises sub-neighborhood means for receiving the relative-position signal and generating therefrom a sub-neighborhood signal indicating the sub-neighborhood in which the given output location is positioned; and
C. the output-intensity means associates different kernels with different sub-neighborhoods in the same neighborhood and is responsive to the sub-neighborhood signal to multiply the submatrix by the kernel associated with the sub-neighborhood that the sub-neighborhood signal indicates.

12. An apparatus as defined in claim 11 wherein:
A. the Y scaling engine operates alternatively in an expansion mode and in a reduction mode;
B. the Y increment output that the Y increment means produces when the Y relative-position signal indicates that the given output row is outside the row neighborhood associated with the given input row is (a) the amount by which the relative positions of the given input and output rows will change if only the given output row is advanced by one row when the Y scaling engine is in its expansion mode and (b) the amount by which the relative positions of the given input and output rows will change if only the given input row is advanced by one row when the Y scaling engine is in its reduction mode;
C. the Y stall-in-row-signal means:
  (i) assumes the advance value whenever the Y scaling engine is in its reduction mode; and
  (ii) whenever the Y scaling engine is in its expansion mode, assumes the advance value when the Y relative-position signal indicates that the given output row is within the row neighborhood associated with the given input row and assumes the stall value when the Y relative-position signal indicates that the given output row is outside the row neighborhood associated with the given input row; and
D. the Y scaling engine further incoudes bypass-row-signal means responsive to the Y relative-position signal for generating a bypass-row signal that:
  (i) assumes a no-bypass value whenever the Y scaling engine is in the expansion mode; and
  (ii) whenever the Y scaling engine is in the reduction mode, assumes the no-bypass value when the relative-position signal indicates that the given output row is within the row neighborhood associated with the given input row and assumes a bypass value when the relative-position signal indicates that the given output row is outside the neighborhood associated with the given input row; and
E. the output-intensity means is responsive to the bypass-row signal to generate the next row of output intensity signals (i) from the input data associated with the next input row if the bypass-row signal associated with the next input row has the no-bypass value and (ii) from the input data associated with a subsequent input row if the bypass-row signal has the bypass value.

13. An apparatus as defined in claim 9 wherein:
A. the Y scaling engine operates alternatively in an expansion mode and in a reduction mode;
B. the Y increment output that the Y increment means produces when the Y relative-position signal indicates that the given output row is outside the row neighborhood associated with the given input row is (a) the amount by which the relative positions of the given input and output rows will change if only the given output row is advanced by one row when the Y scaling engine is in its expansion mode and (b) the amount by which the relative positions of the given input and output rows will change if only the given input row is advanced by one row when the Y scaling engine is in its reduction mode;

C. the Y stall-in-row-signal means:
(i) assumes the advance value whenever the Y scaling engine is in its reduction mode; and
(ii) whenever the Y scaling engine is in its expansion mode, assumes the advance value when the Y relative-position signal indicates that the given output row is within the row neighborhood associated with the given input row and assumes the stall value when the Y relative-position signal indicates that the given output row is outside the row neighborhood associated with the given input row; and D. the Y scaling engine further includes bypass-row-signal means responsive to the Y relative-position signal for generating a bypass-row signal that:
(i) assumes a no-bypass value whenever the Y scaling engine is in the expansion mode; and
(ii) whenever the Y scaling engine is in the reduction mode, assumes the no-bypass value when the relative-position signal indicates that the given output row is within the row neighborhood associated with the given input row and assumes a bypass value when the relative-position signal indicates that the given output row is outside the neighborhood associated with the given input row; and E. the output-intensity means is responsive to the bypass-row signal to generate the next row of output intensity signals (i) from the input data associated with the next input row if the bypass-row signal associated with the next input row has the no-bypass value and (ii) from the input data associated with a subsequent input row if the bypass-row signal associated with the next input row has the bypass value.

14. For generating output intensity signals representing the intensities in an image at output locaions in an array of output locations from input-data signals representing input data associated with input locations in an array of input locations in the same image, each input location having associated therewith a location neighborhood defined by location boundaries in the image, and each output intensity value being generated from the input data associated with the input location in whose location neighborhood that output location is positioned, an apparatus comprising:

A. output-intensity means, adapted to receive a validity signal associated with each input location and assuming one of a valid and an invalid value to indicate whether an output intensity value should be generated from the input data associated with the input location with which that validity signal is associated, the output-intensity means operating in location cycles and being adapted to receive during each location cycle input-data signals representing the input data associated with an input location, for processing the input data represented by the input-data signals applied thereto to generate output intensity signals representing the intensity of the image at an output location therein, the output-intensity means generating the output intensity signals representing the intensity at the next output location (i) from the input data associated with the next input location if the validity signal associated with the next input location has the valid value and (ii) from the input data associated with a subsequent input location if the validity signal associated with the next input location has the invalid value;

B. advancement means operating in each location cycle to apply to the output-intensity means input-data signals representing the input data associated with the next input location; and C. an X scaling engine comprising:
(i) X relative-position means, adapted to receive an X update signal representing an X update value, for storing the X update value as a relative-position quantity representing the difference in position between a given output location and a location boundary of the location neighborhood associated with a given input location and for producing an X relative-position signal representing the stored relative-position quantity and thereby indicating whether the given output location is inside or outside the location neighborhood of the given input location;
(ii) X increment means, responsive to the X relative-position signal, for producing an X increment output representing, (a) when the X relative-position signal indicates that the given output location is within the location neighborhood of the given input location, the amount by which the relative positions of the given input and output locations will change if the given input and the output locations are both advanced by one location and, (b) when the X relative-position signal indicates that the given output location is outside the location neighborhood associated with the given input location, the amount by which the relative positions of the given input and output locations will change if only the given input location is advanced by one location;
(iii) an X adder responsive to the X increment and relative-position signals for generating and applying to the X relative-position means as the X update signal a signal representing the sum of the quantities represented by the X increment and relative-position signals; and
(iv) X validity-signal means responsive to the relative-position signal for generating and applying to the output-intensity means a validity signal that assumes that valid value when the relative-position signal indicates that the given output location is within the location neighborhood associated with the given input location and that assumes that invalid value when the relative-position signal indicates that the given output location is outside the location neighborhood associated with the given input location.

15. An apparatus as defined in claim 14 wherein:
A. the data associated with each input location consists of a submatrix of intensity values representing the intensities in the image at each input location in an input-array subarray associated with that input location; and
B. the output-intensity means generates each output intensity value by multiplying a convolution kernel element-by element by the submatrix associated with an input location.

16. An apparatus as defined in claim 15 wherein:
A. each location neighborhood consists of a plurality of sub-neighborhoods defined by sub-neighborhood boundaries;
B. the apparatus comprises sub-neighborhood means for receiving the X relative-position signal and generating therefrom a sub-neighborhood signal indicating the sub-neighborhood in which the given output location is positioned; and C. the output-intensity means associates different kernels with different sub-neighborhoods in the same neighborhood and is responsive to the sub-neighborhood signal to multiply the submatrix by the kernel associated with the sub-neighborhood that the sub-neighborhood signal indicates.

17. An apparatus as defined in claim 16 wherein:

A. the arrays of input and output locations are organized into input rows and columns and output rows and columns, respectively, each input row having associated therewith a row neighborhood consisting of the location neighborhoods associated with each input location in that input row and being defined by row boundaries consisting of location boundaries that define the location neighborhoods associated with the input locations in that input row;

B. the output-intensity means operates in row cycles, is adapted to receive during each row cycle input-data signals representing the input data associated with the input locations in an input row, and processes the input data represented by the input-data signals applied thereto during a row cycle to generate the output intensity values for the output locations in an output row;

C. the advancement means operates in each row cycle to apply to the output-intensity means input-data signals representing the input data associated with the input locations in the next input row; and D. the apparatus further comprises a Y scaling engine comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output representing, (a) when the Y relative-position signal indicates that the given output row is within the row neighborhood associated with the given output row, the amount by which the relative positions of the given input and output rows will change if the given input and the output rows are both advanced by one row and, (b) when the Y relative-position signal indicates that the given output row is outside the row neighborhood associated with the given input row, the amount by which the relative positions of the given input and output rows will change if only the given input row is advanced by one row;

(iii) a Y adder responsive to the Y increment and relative-position signals for generating and applying to the relative-position means as the Y update signal a signal representing the sum of the quantities represented by the Y increment and relative-position signals; and (iv) Y bypass-row-signal means responsive to the Y relative-position signal for generating a bypass-row signal, associated with the given input row, that assumes the no-bypass value when the Y relative-position signal indicates that the given output row is within the row neighborhood associated with the given input row and that assumes the bypass value when the relative-position signal indicates that the given output row is outside the row neighborhood associated with the given input row;

E. the output-intensity means is responsive to the bypass-row signal to generate output intensity signals representing the inftensities in the next output row (i) from the input data associated with the next input row if the bypass row signal associated with the next input row has the no-bypass value and (ii) from the input data associated with a subsequent input row if the bypass-row signal associated with the next input row has the bypass value; and F. the sub-neighborhood means receives both the X and the Y relative-position signals and generates the sub-neighborhood signal therefrom.

18. An apparatus as defined in claim 14 wherein:

A. the arrays of input and output locations are organized into input rows and columns and output rows and columns, respectively, each input row having associated therewith a row neighborhood consisting of the location neighborhoods associated with each input location in that input row and being defined by row boundaries consisting of locatoion boundaries that define the location neighborhoods associated with the input locations in that input row;

B. the output-intensity means operates in row cycles, is adapted to receive during each row cycle input-data signals representing the input data associated with the input locations in an input row, and processes the input data represented by the input-data signals applied thereto during a row cycle to generate the output intensity values for the output locations in an output row;

C. the advancement means operates in each row cycle to apply to the output-intensity means input-data signals representing the input data associated with the input locations in the next input row; and D. the apparatus further comprises a Y scaling engine comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output representing, (a) when the Y relative-position signal indicates that the given output row is within the row neighborhood associated with the given output row, the amount by which the relative positions of the given input and output rows will change if the given input and the output rows are both advanced by one row and,
(b) when the Y relative-position signal indicates that the given output row is outside the row neighborhood associated with the given input row, the amount by which the relative positions of the given input and output rows will change if only the given input row is advanced by one row;

(iii) a Y adder responsive to the Y increment and relative-position signals for generating and applying to the relative-position means as the Y update signal a signal representing the sum of the quantities represented by the Y increment and relative-position signals; and (iv) Y bypass-row-signal means responsive to the Y relative-position signal for generating a bypass-row signal, associated with the given input row, that assumes the no-bypass value when the Y relative-position signal indicates that the given output row is within the row neighborhood associated with the given input row and that assumes the bypass value when the relative-position signal indicates that the given output row is outside the row neighborhood associated with the given input row; and E. the output-intensity means is responsive to the bypass-row signal to generate the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value.

19. For generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with each input location in that input row and being defined by row boundaries consisting of location boundaries that define the location neighborhoods associated with the input locations in that input row, and each output intensity value being generated from the input data associated with the input location in whose neighborhood that output location is positioned, an apparatus comprising:

A. output-intensity means, adapted to receive a bypass-row signal associated with each input row and assuming one of a bypass and a no-bypass value to indicate whether a row of output intensity values should be generated from the row of input data with which that bypass-row signal is associated, the output-intensity means operating in row cycles and being adapted to receive during each row cycle input-data signals representing the input data associated with the input locations in an input row, for processing the input data represented by the input-data signals applied thereto during a row cycle to generate output intensity signals representing the intensity of the image at the output locations in an output row therein, the output-intensity means generating the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value;

B. advancement means for operating in each row cycle to apply to the output-intensity means input-data signals representing the input data associated with the input locations in the next input row; and C. a Y scaling engine comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output representing, (a) when the Y relative-position signal indicates that the given output row is within the row neighborhood associated with the given input row, the amount by which the relative positions of the given input and output rows will change if the given input and the output rows are both advanced by one row and, (b) when the Y relative-position signal indicates that the given output row is outside the row neighborhood associated with the given input row, the amount by which the relative positions of the given input and output rows will change if only the given input row is advanced by one row;

(iii) a Y adder responsive to the Y increment and relative-position signals for generating and applying to the relative-position means as the Y update signal a signal representing the sum of the quantities represented by the Y increment and relative-position signals; and (iv) Y bypass-row-signal means responsive to the Y relative-position signal for generating a bypass-row signal that assumes a no-bypass value when the Y relative-position signal indicates that the given output row is within the row neighborhood associated with the given input row and that assumes the bypass value when the Y relative-position signal indicates that the given output row is outside the row neighborhood associated with the given input row.

20. An apparatus as defined in claim 19 wherein:

A. the data associated with each input location consists of a submatrix of intensity values representing the intensities in the image at each input location in an input-array subarray associated with that input location; and B. the output-intensity means generates each output intensity value by multiplying a convolution kernel element-by element by the submatrix associated with an input location.

21. An apparatus as defined in claim 20 wherein:

A. each location neighborhood consists of a plurality of sub-neighborhoods defined by sub-neighborhood boundaries;

B. the apparatus comprises sub-neighborhood means for receiving the X relative-position signal and generating therefrom a sub-neighborhood signal indicating the sub-neighborhood in which the given output location is positioned; and C. the output-intensity means associates different kernels with different sub-neighborhoods in the same neighborhood and is responsive to the sub-neighborhood signal to multiply the submatrix by the kernel associated with the sub-neighborhood that the sub-neighborhood signal indicates.

22. For generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity value being generated from the input data associated with the input location in whose neighborhood that output location is positioned, an apparatus comprising:

A. output-intensity means, adapted to receive a validity signal associated with each input location and assuming one of a valid and an invalid value to indicate whether an output intensity value should be generated from the input data associated with the input location with which that validity signal is associated, the output-intensity means being further adapted to receive a bypass-rows signal associated with each input row and assuming one of a bypass and a no-bypass value to indicate whether a row of output intensity values should be generated from the row of input data with which that bypass-row signal is associated, the output-intensity means operating in location cycles and in row cycles that include a plurality of location cycles and being adapted to receive during each location cycle input-data signals representing the input data associated with an input location, the input-data signals received during a row cycle representing the input data associated with the input locations in an input row, for processing the input data represented by the input-data signals applied thereto during a location cycle to generate output intensity signals representing the intensity of the image at an output location therein, the output intensity signals generated by the output-intensity means during a row cycle representing the intensity of the image at the output locationss in an output row, therein, the output-intensity means generating the output intensity signals representing the intensity at the next output location (i) from the input data associated with the next input location if the validity signal associated with the next input location has the valid value and (ii) from the input data associated with a subsequent input location if the validity signal associated with the next input location has the invalid value, the output-intensity means generating the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value;

B. advancement means, adapted to receive a stall-in-column signal that assumes alternatively an advance value and a stall value, the advancement means operating in each location cycle to apply to the output-intensity means (a) when the stall-in-column signal assumes the stall value, input-data signals representing the input data associated with the input location whose data it applied during the previous location cycle and (b) when the stall-in-column signal assumes the advance value, input-data signals representing the input data associated with the next input location the advancement means further being adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input location in the input row whose data it applied during the previous row cycle and, (b) when the stall-in-row signal assumes the advance value, input-data signals representing the input data associated with the input locations in the next input row;

C. an X scaling engine operable alternatively in an expansion mode and in a reduction mode, and comprising:

(i) X relative-position means, adapted to receive an X update signal representing an X update value, for storing the X update value as a relative-position quantity representing the difference in position between a given output location and a location boundary of the location neighborhood associated with a given input location and for producing an X relative-position signal representing the stored relative-position quantity and thereby indicating whether the given output location is inside or outside the location neighborhood associated with the given input location;

(ii) X increment means, responsive to the X relative-position signal, for producing an X increment output, the X increment output that the X increment means produces when the X relative-position signal indicates that the given output location is outside the location neighborhood associated with the given input location representing (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode, the X increment output representing, when the X relative-position signal indicates that the given output location is within the location neighborhood associated with the given input location, the amount by which the relative positions of the given input and output locations will change if the given input and output locations are both advanced by one location;

(iii) an X adder responsive to the X increment and relative-position signals for generating and applying to the X relative-position means as the X update signal a signal representing the sum of the quantities represented by the X increment and relative-position signals;

(iv) X stall-in-column-signal means responsive to the X relative-position signal for generating and applying to the advancement means a stall-in-column signal that:
  (a) assumes the advance value whenever the X scaling engine is in its reduction mode; and
  (b) whenever the X scaling engine is in its expansion mode, assumes the advance value when the X relative-position signal indicates that the given output location is within the location neighborhood associated with the given input location and assumes the stall value when the X relative-position signal indicates that the given output location is outside the neighborhood of the given input location; and (v) validity-signal means responsive to the X relative-position signal for generating a validity signal that:
  (a) assumes the valid value whenever the X scaling engine is in the expansion mode; and
  (b) whenever the X scaling engine is in the reduction mode, assumes the valid value when the relative-position signal indicates that the given output location is within the location neighborhood associated with the given input location and assumes the invalid value when the relative-position signal indicates that the given output location is outside the location neighborhood associated with the given input location; and D. a Y scaling engine operable alternatively in an expansion mode and in a reduction mode and comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representinfg the stored relative-position quantity and thereby indicating whether the given output row is inside or outside the row neighborhood associated with the given input row;

(ii) Y increment means, responsive to the Y relative-position signal, for producing a Y increment output, the Y increment output that the Y increment means produces when the Y relative-position signal indicates that the given output row is outside the row neighborhood associated with the given input row representing (a) the amount by which the relative positions of the given input and output rows will change if only the given output row is advanced by one row when the Y scaling engine is in its expansion mode and (b) the amount by which the relative positions of the given input and output rows will change if only the given input row is advanced by one row when the Y scaling engine is in its reduction mode, the Y increment output representing, when the Y relative-position signal indicates that the given output row is within the row neighborhood of the given input row, the amount by which the relative positions of the given input and output rows will change if the given input and output rows are both advanced by one row;

(iii) a Y adder responsive to the Y increment and relative-position signals for generating and applying to the relative-position means as the Y update signal a signal representing the sum of the quantities represented by the Y increment and relative-position signals;

(iv) Y stall-in-row-signal means responsive to the Y relative-position signal for generating and applying to the advancement means a stall-in-row signal that:
  (a) assumes the advance value whenever the Y scaling engine is in its reduction mode; and
  (b) whenever the Y scaling engine is in its expansion mode, assumes the advance value when the Y relative-position signal indicates that the given output row is within the row neighborhood associated with the given input row and assumes the stall value when the Y relative-position signal indicates that the given output row is outside the row neighborhood associated with the given input row; and (v) bypass-row-signal means responsive to the Y relative-position signal for generating a bypass-row signal that:
  (a) assumes the no-bypass value whenever the Y scaling engine is in the expansion mode; and
  (b) whenever the Y scaling engine is in the reduction mode, assumes the no-bypass value when the relative-position signal indicates that the given output row is within the row neighborhood associated with the given input row and assumes the bypass value when the relative-position signal indicates that the given output row is outside the neighborhood associated with the given input row.

23. For generating output intensity signals representing the intensities in an image at output locations in an array of output locations from input-data signals representing input data associated with input locations in an array of input locations in the same image, each input location having associated therewith a location neighborhood defined by location boundaries in the image, each location neighborhood consisting of a plurality of sub-neighborhoods defined by sub-neighborhood boundaries, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity value being generated from the input data associated with the input location in whose neighborhood that output location is positioned, an apparatus comprising:

A. output-intensity means, adapted to receive a validity signal associated with each input location and assuming one of a valid and an invalid value to indicate whether an output intensity value should be generated from the input data associated with the input location with which that validity signal is associated, the output-intensity means being further adapted to receive a sub-neighborhood signal that indicates a sub-neighborhood and also being adapted to receive a bypass-row signal associated with each input row and assuming one of a bypass and a no-bypass value to indicate whether a row of output intensity values should be generated from the row of input data with which that bypass-row signal is associated, the output-intensity means operating in location cycles and in row cycles that include a plurality of location cycles and being adapted to receive during each location cycle input-data signals representing the input data associated with an input location, the input-data signals received during a row cycle representing the input data associated with the input locations in an input row, the data associated with each input location consisting of a submatrix of intensity values representing the intensities in the image at each input location in an input-array subarray associated with that input location, for processing the input data represented by the input-data signals applied thereto during a location cycle to generate output intensity signals representing the intensity of the image at an output location therein, by multiplying the submatrix associated with each input location element-by-element by the kernel associated with the sub-neighborhood that the sub-neighborhood signal indicates, the output intensity signals generated by the output-intensity means during a row cycle representing the intensity of the image at the output locations in an output row, therein, the output-intensity means generating the output intensity signals representing the intensity at the next output location (i) from the input data associated with the next input location if the validity signal associated with the next input location has the valid value and (ii) from the input data associated with a subsequent input location if the validity signal associated with the next input location has the invalid value, the output-intensity means generating the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value;

B. advancement means, adapted to receive a stall-in-column signal that assumes alternatively an advance value and a stall value, the advancement means operating in each location cycle to apply to the output-intensity means (a) when the stall-in-column signal assumes the stall value, input-data signals representing the input data associated with the input location whose data it applied during the previous location cycle and (b) when the stall-in-column signal assumes the advance value, input-data signals representing the input data associated with the next input location the advancement means further being adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input location in the input row whose data it applied during the previous row cycle and, (b) when the stall-in-row signal assumes the advance value, input-data signals representing the input data associated with the input locations in the next input row;

C. an X scaling engine operable alternatively in an expansion mode and in a reduction mode, and comprising:

(i) X relative-position means, adapted to receive an X update signal representing an X update value, for storing the X update value as a relative-position quantity representing the difference in position between a given output location and a location boundary of the location neighborhood associated with a given input location and for producing an X relative-position signal representing the stored relative-position quantity and thereby indicating whether the given output location is inside or outside the location neighborhood associated with the given input location;

(ii) X increment means, responsive to the X relative-position signal, for producing an X increment output, the X increment output that the X increment means produces when the X relative-position signal indicates that the given output location is outside the location neighborhood associated with the given input location representing (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode, the X increment output representing, when the X relative-position signal indicates that the given output location is within the location neighborhood associated with the given input location, the amount by which the relative positions of the given input and output locations will change if the given input and output locations are both advanced by one location;

(iii) an X adder responsive to the X increment and relative-position signals for generating and applying to the X relative-position means as the X update signal and signal representing the sum of the quantities represented by the X increment and relative-position signals;

(iv) X stall-in-column-signal means responsive to the X relative-position signal for generating and applying to the advancement means a stall-in-column signal that:

(a) assumes the advance value whenever the X scaling engine is in its reduction mode; and (b) whenever the X scaling engine is in its expansion mode, assumes the advance value when the X relative-position signal indicates that the given output location is within the location neighborhood associated with the given input location and assumes the stall value when the X relative-position signal indicates that the given output location is outside the neighborhood of the given input location; and (v) validity-signal means responsive to the X relative-position signal for generating a validity signal that:
  (a) assumes the valid value whenever the X scaling engine is in the expansion mode; and
  (b) whenever the X scaling engine is in the reduction mode, assumes the valid value when the relative-position signal indicates that the given output location is within the location neighborhood associated with the given input location and assumes the invalid value when the relative-position signal indicates that the given output location is outside the location neighborhood associated with the given input location;

D. a Y scaling engine operable alternatively in an expansion mode and in a reduction mode and comprising:
  (i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;
  (ii) Y increment means, responsive to the Y relative-position signal, for producing a Y increment output, the Y increment output that the Y increment means produces when the Y relative-position signal indicates that the given output row is outside the row neighborhood associated with the given input row representing (a) the amount by which the relative positions of the given input and output rows will change if only the given output row is advanced by one row when the Y scaling engine is in its expansion mode and (b) the amount by which the relative positions of the given input and output rows will change if only the given input row is advanced by one row when the Y scaling engine is in its reduction mode, the Y increment output representing, when the Y relative-position signal indicates that the given output row is within the row neighborhood of the given input row, the amount by which the relative positions of the given input and output rows will change if the given input and output rows are both advanced by one row;
  (iii) a Y adder responsive to the Y increment and relative-position signals for generating and applying to the relative-position means as the Y update signal and signal representing the sum of the quantities represented by the Y increment and relative-position signals;
  (iv) Y stall-in-row-signal means responsive to the Y relative-position signal for generating and applying to the advancement means a stall-in-row signal that:
    (a) assumes the advance value whenever the Y scaling engine is in its reduction mode; and
    (b) whenever the Y scaling engine is in its expansion mode, assumes the advance value when the Y relative-position signal indicates that the given output row is within the row neighborhood associated with the given input row and assumes the stall value when the Y relative-position signal indicates that the given output row is outside the row neighborhood associated with the given input row; and
  (v) bypass-row-signal means responsive to the Y relative-position signal for generating a bypass-row signal that:
    (a) assumes the no-bypass value whenever the Y scaling engine is in the expansion mode; and
    (b) whenever the Y scaling engine is in the reduction mode, assumes the no-bypass value when the relative-position signal indicates that the given output row is within the row neighborhood associated with the given input row and assumes the bypass value when the relative-position signal indicates that the given output row is outside the neighborhood associated with the given input row; and E. sub-neighborhood means for receiving the X and Y relative-position signals, generating therefrom a sub-neighborhood signal indicating the sub-neighborhood in which the given output location is positioned, and applying the sub-neighborhood signal to the output-intensity means.

24. For generating output intensity signals representing the intensities in an image at output locations in an array of output locations from input-data signals representing input data associated with input locations in an array of input locations in the same image, each input location having associated therewith a location neighborhood defined by location boundaries in the image, and each output intensity being generated from the input data associated with the input location in whose location neighborhood that output location is positioned, a method comprising the steps of:

A. receiving input-data signals representing the input data associated with input locations;

B. maintaining an X relative-position quantity that represents the difference in position between a given output location and a location boundary of the location neighborhood associated with a given input location, the X relative-position quantity thereby indicating whether the given output location is inside or outside the location neighborhood associated with the given input location;

C. computing the output intensity at the output location that precedes the given output location from the data associated with the input location that precedes the given input location;

D. generating an output intensity signal representing the output intensity computed in step C;

E. selectively advancing the input and output locations by:
  (i) if the X relative-position quantity indicates that the given output location is outside the location neighborhood associated with the given input location, incrementing the X relative-position quantity by the amount by which the relative positions of the input and output locations change when only the given output location is advanced by one location; and
  (ii) if the X relative-position quantity indicates that the given output location is inside the location neighborhood associated with the given input location, incrementing the X relative-position quantity by the amount by which the relative positions of the given input and output locations change when the input and output locations are both advanced by one location; and F. repeating steps C, D, and E a plurality of times.

25. For generating output intensity signals representing the intensities in an image at output locations in an array of output locations from input-data signals representing input data associated with input locations in an array of input locations in the same image, each input location having associated therewith a location neighborhood defined by location boundaries in the image, and each output intensity being generated from the input data associated with the input location in whose location neighborhood that output location is positioned, a method comprising the steps of:

A. receiving input-data signals representing the input data associated with input locations;

B. maintaining an X relative-position quantity that represents the difference in position between a given output location and a location boundary of the location neighborhood associated with a given input location, the X relative-position quantity thereby indicating whether the given output location is inside or outside the location neighborhood associated with the given input location;

C. if the X relative-position quantity indicates that the given output location is inside the location neighborhood associated with the given input location, computing the output intensity at the given output location from the data associated with the given input location;

D. if the X relative-position quantity indicates that the given output location is inside the location neighborhood associated with the given input location, generating an output intensity signal representing the output intensity computed in step C;

E. selectively advancing the given input and output locations by:
  (i) if the X relative-position quantity indicates that the given output location is outside the location neighborhood associated with the given input location, incrementing the X relative-position quantity by the amount by which the relative positions of the given input and output locations change when only the given input location is advanced by one location; and
  (ii) if the X relative-position quantity indicates that the given output location is inside the location neighborhood associated with the given input location, incrementing the X relative-position quantity by the amount by which the relative positions of the given input and output locations change when the given input and the given output locations are both advanced by one location; and F. repeating steps C, D, and E a plurality of times.

26. For generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity being generated from the input data associated with the input location in whose neighborhood that output location is positioned, a method comprising the steps of:

A. receiving input-data signals representing the input data associated with the input locations in input rows;

B. maintaining a Y relative-position quantity that represents the difference in position between a given output row and a row boundary of the row neighborhood associated with a given input row, the Y relative-position position quantity thereby indicating whether the given output row is inside or outside the row neighborhood associated with the given input row;

C. computing the output intensities in the output row preceding the given output row from the data associated with the input row that precedes the given input row;

D. generating output intensity signals representing the output intensities computed in step C;

E. selectively advancing the given input and output rows by:
  (i) if the Y relative-position quantity indicates that the given output row is outside the row neighborhood associated with the given output row, incrementing the Y relative-position quantity by the amount by which the relative positions of the given input and output rows change when only the given output row is advanced by one location; and
  (ii) if the Y relative-position quantity indicates that the given output row is inside the row neighborhood associated with the given input row, incrementing the Y relative-position quantity by the amount by which the relative positions of the given input and output rows change when the given input and the given output rows are both advanced by one row; and F. repeating steps C, D, and E a plurality of times.

27. For generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity being generated from the input data associated with the input location in whose neighborhood that output location is positioned, a method comprising the steps of:

A. receiving input-data signals representing the input data associated with the input locations in input rows;

B. maintaining a Y relative-position quantity that represents the difference in position between a given output row and a row boundary of the row neighborhood associated with a given input row, the Y relative-position quantity thereby indicating whether the given output row is inside or outside the row neighborhood associated with the given input row;

C. if the Y relative-position quantity indicates that the given output row is inside the row neighborhood associated with the given input row, computing the output intensities in the given output row from the data associated with the given input row;

D. generating output intensity signals representing the output intensities computed in step C;

E. selectively advancing the input and output rows by:
  (i) if the Y relative-position quantity indicates that the given output row is outside the row neighborhood associated with the given input row, incrementing the Y relative-position quantity by the amount by which the relative positions of the given input and output rows change when only the given input row is advanced by one row; and
  (ii) if the Y relative-position quantity indicates that the given output row is within the row neighborhood associated with the given input row, incrementing the Y relative-position quantity by the amount by which the relative positions of the given input and output rows change when the given input and the given output rows are both advanced by one row; and F. repeating steps C, D, and E a plurality of times.

28. A scaling circuit for use in an apparatus for generating output intensity signals representing the intensities in an image at output locations in an array of output locations from input-data signals representing input data associated with input locations in an array of input locations in the same image, each input location having associated therewith a location neighborhood defined by location boundaries in the image, and each output intensity value being generated from the input data associated with the input location in whose location neighborhood that output location is positioned, which apparatus includes output-intensity means, operating in location cycles and adapted to receive during each location cycle input-data signals representing the input data associated with an input location, for processing the input data represented by the input-data signals applied thereto to generate output intensity signals representing the intensity of the image at an output location therein and advancement means, adapted to receive a stall-in-column signal that assumes alternatively an advance value and a stall value, the advancement means operating in each location cycle to apply to the output-intensity means (a) when the stall-in-column signal assumes the stall value, input-data signals representing the input data associated with the input location whose data it applied during the previous location cycle and (b) when the stall-in-column signal assumes the advance value, input-data signals representing the input data associated with the next input location, the scaling circuit comprising an X scaling engine that includes:

A. X relative-position means, adapted to receive an X update signal representing an X update value, for storing the X update value as a relative-position quantity representing the difference in position between a given output location and a location boundary of the location neighborhood associated with given input location and for producing an X relative-position signal representing the stored relative-position quantity and thereby indicating whether the given output location is inside or outside the location neighborhood associated with the given input location;

B. X increment means, responsive to the X relative-position signal, for producing an X increment output representing, (a) when the X relative-position signal indicates that the given output location is within the location neighborhood associated with the given input location, the amount by which the relative positions of the given input and output locations will change if the given input and output locations are both advanced by one location and, (b) when the X relative-position signal indicates that the given output location is outside the location neighborhood associated with the given input location, the amount by which the relative positions of the given input and output locations will change if only the given output location is advanced by one location;

C. an X adder responsive to the X increment and relative-position signals for generating and applying to the X relative-position means as the X update signal a signal representing the sum of the quantities represented by the X increment and relative-position signals; and D. X stall-in-column-signal means responsive to the X relative-position signal for generating and applying to the advancement means a stall-in-column-signal that assumes the advance value when the relative-position signal indicates that the given output location is within the location neighborhood associated with the given input location and that assumes the stall value when the relative-position signal indicates that the given output location is outside the location neighborhood associated with the given input location.

29. A scaling circuit as defined in claim 28 wherein:

A. the arrays of input and output locations are organized into input rows and columns and output rows and columns, respectively, each input row having associated therewith a row neighborhood consisting of the location neighborhoods associated with the input location in that input row and being defined by row boundaries consisting of location boundaries that define the location neighborhoods associated with the input locations in that input row;

B. the output-intensity means operates in row cycles, is adapted to receive during each row cycle input-data signals representing the input data associated with the input locations in an input row, and processes the input data represented by the input-data signals applied thereto during a row cycle to generate the output intensity signals representing the intensity values for the output locations in an output row;

C. the advancement means is adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input location in the input row whose data it applied during the previous row cycle and, (b) when the stall-in-row signal assumes the advance value, input-data signals representing the input data associated with the input locations in the next input row; and D. the scaling circuit further comprises a Y scaling engine comprising:
   (i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;
   (ii) Y increment means, responsive to the Y relative-position signal, for producing a Y increment output representing, (a) when the Y relative-position signal indicates that the given output row is within the row neighborhood associated with the given input row, the amount by which the relative positions of the given input and output rows will change if the given input and output rows are both advanced by one row and, (b) when the Y relative-position signal indicates that the given output row is outside the neighborhood of the given input row, the amount by which the relative positions of the given input and output rows will change if only the given output row is advanced by one row;
   (iii) a Y adder responsive to the Y increment and relative-position signals for generating and applying to the relative-position means as the Y update signal a signal representing the sum of the quantities represented by the Y increment and relative-position signals; and
   (iv) Y stall-in-row-signal means responsive to the Y relative-position signal for generating and applying to the advancement means a stall-in-row signal that assumes the advance value when the Y relative-position signal indicates that the given output row is within the row neighborhood associated with the given input row and that assumes the stall value when the Y relative-position signal indicates that the given output row is outside the row neighborhood associated with the given input row.

30. A scaling circuit as defined in claim 29 wherein:
A. the X scaling engine is operable alternatively in an expansion mode and in a reduction mode;
B. the X increment output that the X increment means produces when the X relative-position signal indicates that the given output location is outside the location neighborhood associated with the given input location is (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode;
C. The X stall-in-column-signal means:
   (i) assumes the advance value whenever the X scaling engine is in its reduction mode; and
   (ii) whenever the X scaling engine is in its expansion mode, assumes the advance value when the X relative-position signal indicates that the given output location is within the location neighborhood associated with the given input location and assumes the stall value when the X relative-position signal indicates that the given output location is outside the neighborhood of the given input location;
D. the X scaling engine further includes validity-signal means responsive to the X relative-position signal for generating a validity signal that:
   (i) assumes a valid value whenever the X scaling engine is in the expansion mode; and
   (ii) whenever the X scaling engine is in the reduction mode, assumes the valid value when the relative-position signal indicates that the given output location is within the location neighborhood associated with the given input location and assumes an invalid value when the relative-position signal indicates that the given output location is outside the location neighborhood associated with the given input location; and
E. the output-intensity means is responsive to the validity signal to generate the output intensity signals representing the intensity at the next output location (i) from the input data associated with the next input location if the validity signal associated with the next input location has the valid value and (ii) from the input data associated with a subsequent input location if the validity signal associated with the next input location has the invalid value.

31. A scaling circuit as defined in claim 28 wherein:
A. the X scaling engine is operable alternatively in an expansion mode and in a reduction mode;
B. the X increment output that the X increment means produces when the X relative-position signal indicates that the given output location is outside the location neighborhood associated with the given input location is (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode;
C. the X stall-in-column-signal means:
   (i) assumes the advance value whenever the X scaling engine is in its reduction mode; and
   (ii) whenever the X scaling engine is in its expansion mode, assumes the advance value when the X relative-position signal indicates that the given output location is within the location neighborhood associated with the given input location and assumes the stall value when the X relative-position signal indicates that the given output location is outside the neighborhood of the given input location;
D. the X scaling engine further includes validity-signal means responsive to the relative-position signal for generating a validity signal that:
   (i) assumes a valid value whenever the X scaling engine is in the expansion mode; and
   (ii) whenever the X scaling engine is in the reduction mode, assumes the valid value when the relative-position signal indicates that the given output location is within the location neighborhood associated with the given input location and assumes an invaid value when the relative-position signal indicates that the given output location is outside the location neighborhood associated with the given input location; and E. the output-intensity means is responsive to the validity signal to generate the output intensity signals representing the intensity at the next output location (i) from the input data associated with the next input location if the validity signal associated with the next input location has the valid value and (ii) from the input data associated with a subsequent input location if the validity signal associated with the next input location has the invalid value.

32. A scaling circuit for use in an apparatus for generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity value being generated from the input data associated with the input location in whose neighborhood that output location is positioned, which apparatus includes output-intensity means, operating in row cycles and adapted to receive during each row cycle input-data signals representing the input data associated with the input locations in an input row, for processing the input data represented by the input-data signals applied thereto during a row cycle to generate output intensity signals representing the intensities of the image at the output locations in a row of output locations therein and advancement means, adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input locations in the input row whose data it applied during the previous row cycle and, (b) when the stall-in-row signal assumes the advance value, input-data signals representing the input data associated with the input locations in the next input row, the scaling circuit comprising a Y scaling engine that includes:

A. Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

B. Y increment means, responsive to the Y relative-position signal, for producing a Y increment output representing, (a) when the Y relative-position signal indicates that the given output row is within the row neighborhood of the given input row, the amount by which the relative positions of the given input and output rows will change if the given input and output rows are both advanced by one row and, (b) when the Y relative-position signal indicates that the given output row is outside the row neighborhood of the given input row, the amount by which the relative positions of the given input and output rows will change if only the given output row is advanced by one row;

C. a Y adder responsive to the Y increment and relative-position signals for generating and applying to the relative-position means as the Y update signal a signal representing the sum of the quantities represented by the Y increment and relative-position signals; and D. Y stall-in-row-signal means responsive to the Y relative-position signal for generating and applying to the advancement means a stall-in-row signal that assumes the advance value when the Y relative-position signal indicates that the given output row is within the row neighborhood associated with the given input row and that assumes the stall value when the Y relative-position signal indicates that the given output row is outside the row neighborhood associated with the given input row.

33. A scaling circuit as defined in claim 32 wherein:

A. the Y scaling engine operates alternatively in an expansion mode and in a reduction mode;

B. the Y increment output that the Y increment means produces when the Y relative-position signal indicates that the given output row is outside the row neighborhood associated with the given input row is (a) the amount by which the relative positions of the given input and output rows will change if only the given output row is advanced by one row when the Y scaling engine is in its expansion mode and (b) the amount by which the relative positions of the given input and output rows will change if only the given input row is advanced by one row when the Y scaling engine is in its reduction mode;

C. the Y stall-in-row-signal means:
(i) assumes the advance value whenever the Y scaling engine is in its reduction mode; and
(ii) whenever the Y scaling engine is in its expansion mode, assumes the advance value when the Y relative-position signal indicates that the given output row is within the row neighborhood associated with the given input row and assumes the stall value when the Y relative-position signal indicates that the given output row is outside the row neighborhood associated with the given input row; and D. the Y scaling engine further includes bypass-row-signal means responsive to the Y relative-position signal for generating a bypass-row signal that:
(i) assumes a no-bypass value whenever the Y scaling engine is in the expansion mode; and
(ii) whenever the Y scaling engine is in the reduction mode, assumes the no-bypass value when the relative-position signal indicates that the given output row is within the row neighborhood associated with the given input row and assumes a bypass value when the relative-position signal indicates that the given output row is outside the neighborhood associated with the given input row; and E. the output-intensity means is responsive to the bypass-row signal to generate the next row of output intensity signals (i) from the input data associated with the next input row if the bypass-row signal associated with the next input row has the no-bypass value and (ii) from the input data associated with a subsequent input row if the bypass-row signal associated with the next input row has the bypass value.

34. A scaling circuit for use in an apparatus for generating output intensity signals representing the intensities in an image at output locations in an array of output locations from input-data signals representing input data associated with input locations in an array of input locations in the same image, each input location having associated therewith a location neighborhood defined by location boundaries in the image, and each output intensity value being generated from the input data associated with the input location in whose location neighborhood that output location is positioned, which apparatus includes output-intensity means, adapted to receive a validity signal associated with each input location and assuming one of a valid and an invalid value to indicate whether an output intensity value should be generated from the input data associated with the input location with which that validity signal is associated, the output-intensity means operating in location cycles and being adapted to receive during each location cycle input-data signals representing the input data associated with an input location, for processing the input data represented by the input-data signals applied thereto to generate output intensity signals representing the intensity of the image at an output location therein, the output-intensity means generating the output intensity signals representing the intensity at the next output location (i) from the input data associated with the next input location if the validity signal associated with the next input location has the valid value and (ii) from the input data associated with a subsequent input location if the validity signal associated with the next input location has the invalid value and advancement means operating in each location cycle to apply to the output-intensity means input-data signals representing the input data associated with the next input location, the scaling circuit comprising an X scaling engine that includes:

A. X relative-position means, adapted to receive an X update signal representing an X update value, for storing the X update value as a relative-position quantity representing the difference in position between a given output location and a location boundary of the location neighborhood associated with a given input location and for producing an X relative-position signal representing the stored relative-position quantity and thereby indicating whether the given output location is inside or outside the location neighborhood of the given input location;

B. X increment means, responsive to the X relative-position signal, for producing an X increment output representing, (a) when the X relative-position signal indicates that the given output location is within the location neighborhood of the given input location, the amount by which the relative positions of the given input and output locations will change if the given input and the output locations are both advanced by one location and, (b) when the X relative-position signal indicates that the given output location is outside the location neighborhood associated with the given input location, the amount by which the relative positions of the given input and output locations will change if only the given input location is advanced by one location;

C. an X adder responsive to the X increment and relative-position signals for generating and applying to the X relative-position means as the X update signal a signal representing the sum of the quantities represented by the X increment and relative-position signals; and D. X validity-signal means responsive to the relative-position signal for generating and applying to the output-intensity means a validity signal that assumes the valid value when the relative-position signal indicates that the given output location is within the location neighborhood associated with the given input location and that assumes the invalid value when the relative-position signal indicates that the given output location is outside the location neighborhood associated with the given input location.

35. A scaling circuit as defined in claim 34 wherein:

A. the arrays of input and output locations are organized into input rows and columns and output rows and columns, respectively, each input row having associated therewith a row neighborhood consisting of the location neighborhoods associated with each input location in that input row and being defined by row boundaries consisting of location boundaries that define the location neighborhoods associated with the input locations in that input row;

B. The output-intensity means operates in row cycles, is adapted to receive during each row cycle input-data signals representing the input data associated with the input locations in an input row, and processes the input data represented by the input-data signals applied thereto during a row cycle to generate the output intensity values for the output locations in an output row;

C. the advancement means operates in each row cycle to apply to the output-intensity means input-data signals representing the input data associated with the input locations in the next input row; and D. the scaling circuit further comprises a Y scaling engine comprising:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output representing, (a) when the Y relative-position signal indicates that the given output row is within the row neighborhood associated with the given output row, the amount by which the relative positions of the given input and output rows will change if the given input and the output rows are both advanced by one row and, (b) when the Y relative-position signal indicates that the given output row is outside the row neighborhood associated with the given input row, the amount by which the relative positions of the given input and output rows will change if only the given input row is advanced by one row;

(iii) a Y adder responsive to the Y increment and relative-position signals for generating and applying to the relative-position means as the Y update signal a signal representing the sum of the quantities represented by the Y increment and relative-position signals; and (iv) Y bypass-row-signal means responsive to the Y relative-position signal for generating a bypass-row signal, associated with the given input row, that assumes the no-bypass value when the Y relative-position signal indicates that the given output row is within the row neighborhood associated with the given input row and that assumes the bypass value when the relative-position signal indicates that the given output row is outside the row neighborhood associated with the given input row; and E. the output-intensity means is responsive to the bypass-row signal to generate the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value.

36. A scaling circuit for use in an apparatus for generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with each input location in that input row and being defined by row boundaries consisting of location boundaries that define the location neighborhoods associated with the input locations in that input row, and each output intensity value being generated from the input data associated with the input location in whose neighborhood that output location is positioned, which apparatus includes output-intensity means, adapted to receive a bypass-row signal associated with each input row and assuming one of a bypass and a no-bypass value to indicate whether a row of output intensity values should be generated from the row of input data with which that bypass-row signal is associated, the output-intensity means operating in row cycles and being adapted to receive during each row cycle input-data signals representing the input data associated with the input locations in a input row, for processing the input data represented by the input-data signals applied thereto during a row cycle to generate output intensity signals representing the intensity of the image at the output locations in an output row therein, the output-intensity means generating the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value, the apparatus further including advancement means for operating in each row cycle to apply to the output-intensity means input-data signals representing the input data associated with the input locations in the next input row, the scaling circuit comprising a Y scaling engine that includes:

A. Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

B. Y increment means, responsive to the Y relative-position signal, for producing a Y increment output representing, (a) when the Y relative-position signal indicates that the given output row is within the row neighborhood associated with the given input row, the amount by which the relative positions of the given input and output rows will change if the given input and the output rows are both advanced by one row and, (b) when the Y relative-position signal indicates that the given output row is outside the row neighborhood associated with the given input row, the amount by which the relative positions of the given input and output rows will change if only the given input row is advanced by one row;

C. a Y adder responsive to the Y increment and relative-position signals for generating and applying to the relative-position means as the Y update signal a signal representing the sum of the quantities represented by the Y increment and relative-position signals; and D. Y bypass-row-signal means responsive to the Y relative-position signal for generating a bypass-row signal that assumes a no-bypass value when the Y relative-position signal indicates that the given output row is within the row neighborhood associated with the given input row and that assumes the bypass value when the Y relative-position signal indicates that the given output row is outside the row neighborhood associated with the given input row.

37. A scaling circuit for use in an apparatus for generating output intensity signals representing the intensities in an image at output locations in an array of output locations from input-data signals representing input data associated with input locations in an array of input locations in the same image, each input location having associated therewith a location neighborhood defined by location boundaries in the image, the arrays of input and output locations being organized into input rows and columns and output rows and columns, respectively, each input row having associated therewith a row neighborhood consisting of the location neighborhoods associated with the input locations in that input row and being defined by row boundaries consisting of location boundaries that define the neighborhoods associated with the input locations in that input row, and each output intensity value being generated from the input data associated with the input location in whose neighborhood that output location is positioned, which apparatus includes output-intensity means, adapted to receive a validity signal associated with each input location and assuming one of a valid and an invalid value to indicate whether an output intensity value should be generated from the input data associated with the input location with which that validity signal is associated, the output-intensity means being further adapted to receive a bypass-row signal associated with each input row and assuming one of a bypass and a no-bypass value to indicate whether a row of output intensity values should be generated from the row of input data with which that bypass-row signal is associated, the output-intensity means operating in location cycles and in row cycles that include a plurality of location cycles and being adapted to receive during each location cycle input-data signals representing the input data associated with an input location, the input-data signals received during a row cycle representing the input data associated with the input locations in an input row, for processing the input data represented by the input-data signals applied thereto during a location cycle to generate output intensity signals representing the intensity of the image at an output location therein, the output intensity signals generated by the output-intensity means during a row cycle representing the intensity of the image at the output locations in an output row, therein, the output-intensity means generating the output intensity signals representing the intensity at the next output location (i) from the input data associated with the next input location if the validity signal associated with the next input location has the valid value and (ii) from the input data associated with a subsequent input location if the validity signal associated with the next input location has the invalid value, the output-intensity means generating the output intensity signals representing the intensities in the next output row (i) from the input data associated with the next input row if the bypass-row signal associated with the next input row has the no-bypass value and (ii) from the input data associated with a subsequent input row if the bypass-row signal associated with the next input row has the bypass value, the apparatus further including advancement means, adapted to receive a stall-in-column signal that assumes alternatively an advance value and a stall value, the advancement means operating in each location cycle to apply to the output-intensity means (a) when the stall-in-column signal assumes the stall value, input-data signals representing the input data associated with the input location whose data it applied during the previous location cycle and (b) when the stall-in-column signal assumes the advance value, input-data signals representing the input data associated with the next input location the advancement means further being adapted to receive a stall-in-row signal that alternatively assumes an advance value and a stall value, the advancement means operating in each row cycle to apply to the output-intensity means, (a) when the stall-in-row signal assumes the stall value, input-data signals representing the input data associated with the input location in the input row whose data it applied during the previous row cycle and, (b) when the stall-in-row signal assumes the advance value, input-data signals representing the input data associated with the input locations in the next input row, the scaling circuit comprising:

A. an X scaling engine operable alternatively in an expansion mode and in a reduction mode and including:

(i) X relative-position means, adapted to receive an X update signal representing an X update value, for storing the X update value as a relative-position quantity representing the difference in position between a given output location and a location boundary of the location neighborhood associated with a given input location and for producing an X relative-position signal representing the stored relative-position quantity and thereby indicating whether the given output location is inside or outside the location neighborhood associated with the given input location;

(ii) X increment means, responsive to the X relative-position signal, for producing an X increment output, the X increment output that the X increment means produces when the X relative-position signal indicates that the given output location is outside the location neighborhood associated with the given input location representing (a) the amount by which the relative positions of the given input and output locations will change if only the given output location is advanced by one location when the X scaling engine is in its expansion mode and (b) the amount by which the relative positions of the given input and output locations will change if only the given input location is advanced by one location when the X scaling engine is in its reduction mode, the X increment output representing, when the X relative-position signal indicates that the given output location is within the location neighborhood associated with the given input location, the amount by which the relative positions of the given input and output locations will change if the give input and output locations are both advanced by one location;

(iii) an X adder responsive to the X increment and relative-position signals for generating and applying to the X relative-position means as the X update signal a signal representing the sum of the quantities represented by the X increment and relative-position signals;

(iv) X stall-in-column-signal means responsive to the X relative-position signal for generating and applying to the advancement means a stall-in-column signal that:

(a) assumes the advance value whenever the X scaling engine is in its reduction mode; and (b) whenever the X scaling engine is in its expansion mode, assumes the advance value when the X relative-position signal indicates that the given output location is within the location neighborhood associated with the given input location and assumes the stall value when the X relative-position signal indicates that the given output location is outside the neighborhood of the given input location; and (v) validity-signal means responsive to the X relative-position signal for generating a validity signal that:

(a) assumes the valid value whenever the X scaling engine is in the expansion mode; and (b) whenever the X scaling engine is in the reduction mode, assumes the valid value when the relative-position signal indicates that the given output location is within the location neighborhood associated with the given input location and assumes the invalid value when the relative-position signal indicates that the given output location is outside the location neighborhood associated with the given input location; and B. a Y scaling engine operable alternatively in an expansion mode and in a reduction mode and including:

(i) Y relative-position means, adapted to receive a Y update signal representing a Y update value, for storing the Y update value as a relative-position quantity representing the difference in position between a given output row and a row boundary of the row neighborhood associated with a given input row and for producing a Y relative-position signal representing the stored relative-position quantity and thereby indicating whether the given output row is inside or outside the row neighborhood associated with the given input row;

(ii) Y increment means, responsive to the Y relative-position signal, for producing a Y increment output, the Y increment output that the Y increment means produces when the Y relative-position signal indicates that the given output row is outside the row neighborhood associated with the given input row representing (a) the amount by which the relative positions of the given input and output rows will change if only the given output row is advanced by one row when the Y scaling engine is in its expansion mode and (b) the amount by which the relative positions of the given input and output rows will change if only the given input row is advanced by one row when the Y scaling engine is in its reduction mode, the Y increment output representing, when the Y relative-position signal indicates that the given output row is within the row neighborhood of the given input row, the amount by which the relative positions of the given input and output rows will change if the given input and output rows are both advanced by one row;

(iii) a Y adder responsive to the Y increment and relative-position signals for generating and applying to the relative-position means as the Y update signal a signal representing the sum of the quantities represented by the Y increment and relative-position signals;

(iv) Y stall-in-row-signal means responsive to the Y relative-position signal for generating and applying to the advancement means a stall-in-row signal that:

(a) assumes the advance value whenever the Y scaling engine is in its reduction mode; and (b) whenever the Y scaling engine is in its expansion mode, assumes the advance value when the Y relative-position signal indicates that the given output row is within the row neighborhood associated with the given input row and assumes the stall value when the Y relative-position signal indicates that the given output row is outside the row neighborhood associated with the given input row; and (v) bypass-row-signal means responsive to the Y relative-position signal for generating a bypass-row signal that:

(a) assumes the no-bypass value whenever the Y scaling engine is in the expansion mode; and (b) whenever the Y scaling engine is in the reduction mode, assumes the no-bypass value when the relative-position signal indicates that the given output row is within the row neighborhood associated with the given input row and assumes the bypass value when the relative-position signal indicates that the given output row is outside the neighborhood associated with the given input row.

* * * * *